United States Patent [19]

Itoh

[11] Patent Number: 4,890,226
[45] Date of Patent: Dec. 26, 1989

[54] MEMORY ACCESS CONTROL APPARATUS HAVING EMPTY REAL ADDRESS STORING MEMORY AND LOGICAL ADDRESS/REAT ADDRESS PAIR STORING MEMORY

[75] Inventor: Sumio Itoh, Kawasaki, Japan
[73] Assignee: Fujitsu Limited, Kawasaki, Japan
[21] Appl. No.: 134,605
[22] Filed: Dec. 14, 1987

Related U.S. Application Data

[63] Continuation of Ser. No. 704,550, Feb. 22, 1985, abandoned.

[30] Foreign Application Priority Data

Feb. 29, 1984 [JP] Japan .................. 59-37883

[51] Int. Cl.⁴ .......... G06F 12/10; G06F 3/12
[52] U.S. Cl. .................. 364/200; 364/238.4;
364/239.51; 364/244.3; 364/256.6; 364/252;
364/519; 400/279
[58] Field of Search ........ 364/200, 900, 518, 521,
364/519; 340/750, 799; 400/63, 76, 279

[56] References Cited

U.S. PATENT DOCUMENTS

| 4,074,254 | 2/1978 | Belser et al. ............ 364/900 |
| 4,126,894 | 11/1978 | Cronshaw et al. ........ 364/200 |
| 4,131,883 | 12/1978 | Lundstrom ............... 364/900 |
| 4,153,950 | 5/1979 | Nosowicz et al. ........ 365/231 |
| 4,203,107 | 5/1980 | Lovercheck ............. 364/900 |
| 4,496,976 | 1/1985 | Swanson et al. ......... 340/744 X |
| 4,511,962 | 4/1985 | Machida et al. ......... 364/200 |
| 4,570,217 | 2/1986 | Allen et al. ........... 364/900 X |
| 4,580,134 | 4/1986 | Campbell et al. ........ 340/747 X |
| 4,590,585 | 5/1986 | Cummings et al. ........ 364/900 |
| 4,618,926 | 10/1986 | Kubo et al. ............ 364/200 |
| 4,646,259 | 2/1987 | Lincoln et al. ......... 364/900 |
| 4,761,643 | 8/1988 | Fujiwara ............... 340/750 X |

FOREIGN PATENT DOCUMENTS

54-89438 7/1979 Japan .
56-72751 6/1981 Japan .
58-29186 2/1983 Japan .

Primary Examiner—David Y. Eng
Assistant Examiner—Thomas C. Lee
Attorney, Agent, or Firm—Staas & Halsey

[57] ABSTRACT

A memory access control apparatus includes an address detecting (CAQ) circuit for detecting a real address at which read data has been stored, and a correspondence storing circuit (CAT) for storing a correspondence between a real address and a logical address. A control circuit (IMC) is also provided for controlling a writing operation in such a way that, at a real address detected by the address detecting circuit, a next transfer unit of data is written, after the transfer unit of data previously stored at the real address has been read, by specifying the corresponding logical address. Thus, a continuous reading can be effected without stopping due to a writing operation.

14 Claims, 22 Drawing Sheets

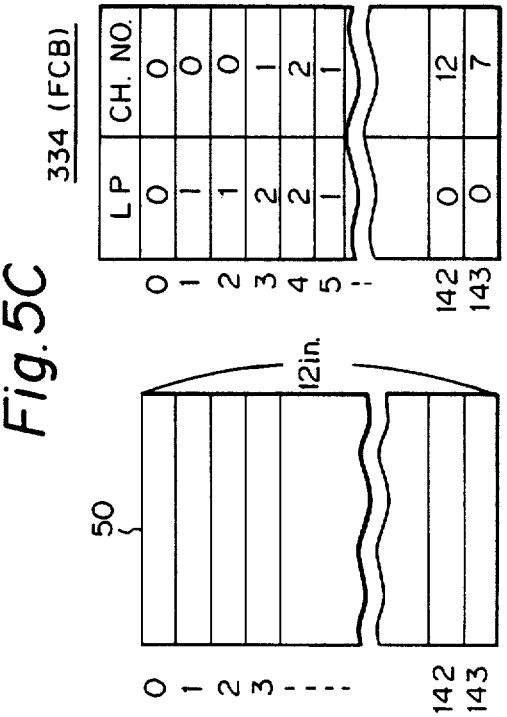

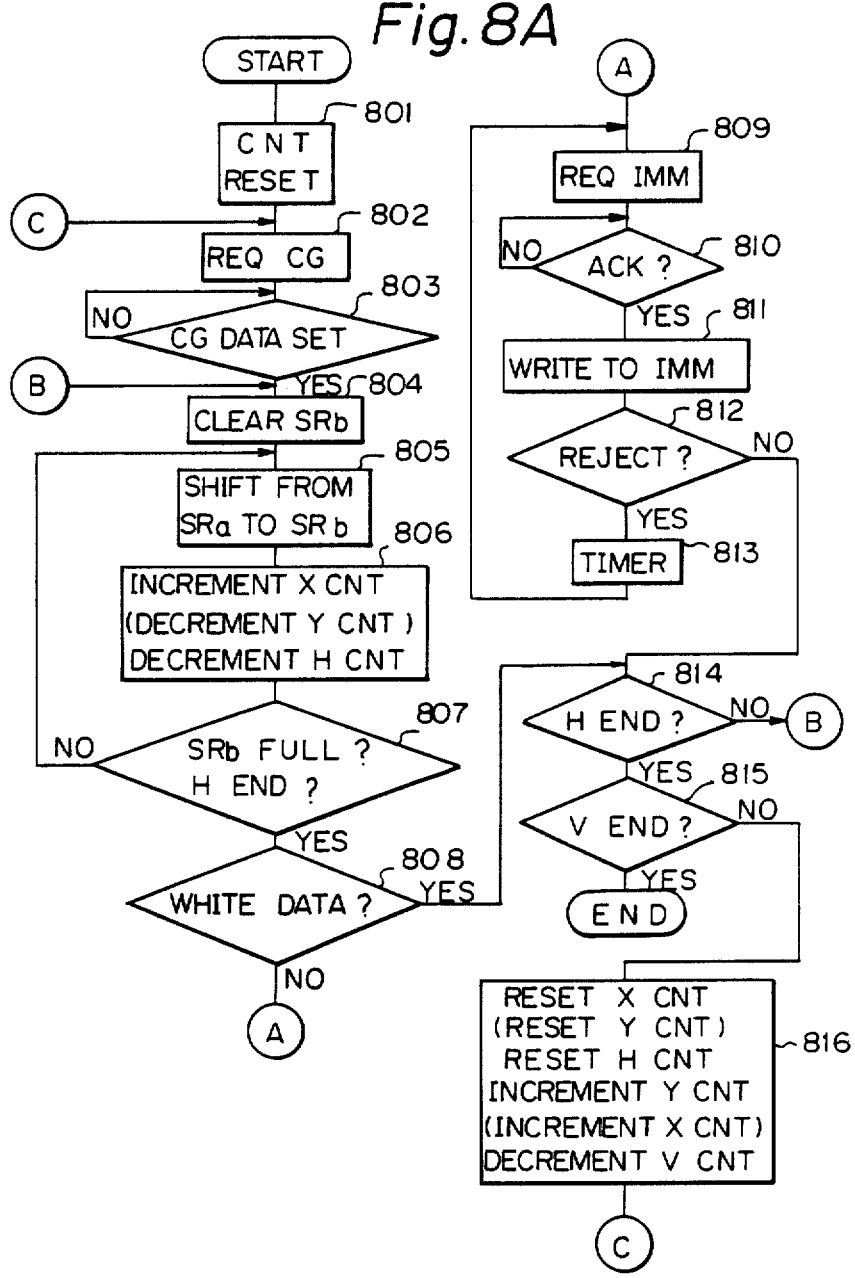

| Y X | CAT(P₀) | Y X | CAT(P₁) | CA Q |
|---|---|---|---|---|
| 0 0 | 0 00 | 0 0 | 0 — | 00 |
| 0 1 | 0 01 | 0 1 | 0 — | 01 |
| 0 2 | 0 — | 0 2 | 1 08 | 02 |
| 1 0 | 0 02 | 1 0 | 1 04 | 03 |
| 1 1 | 0 03 | 1 1 | 1 05 | |
| 1 2 | 0 — | 1 2 | 0 — | |
| 2 0 | 0 — | 2 0 | 1 06 | |
| 2 1 | 0 — | 2 1 | 1 07 | |
| 2 2 | 0 — | 2 2 | 0 — | |

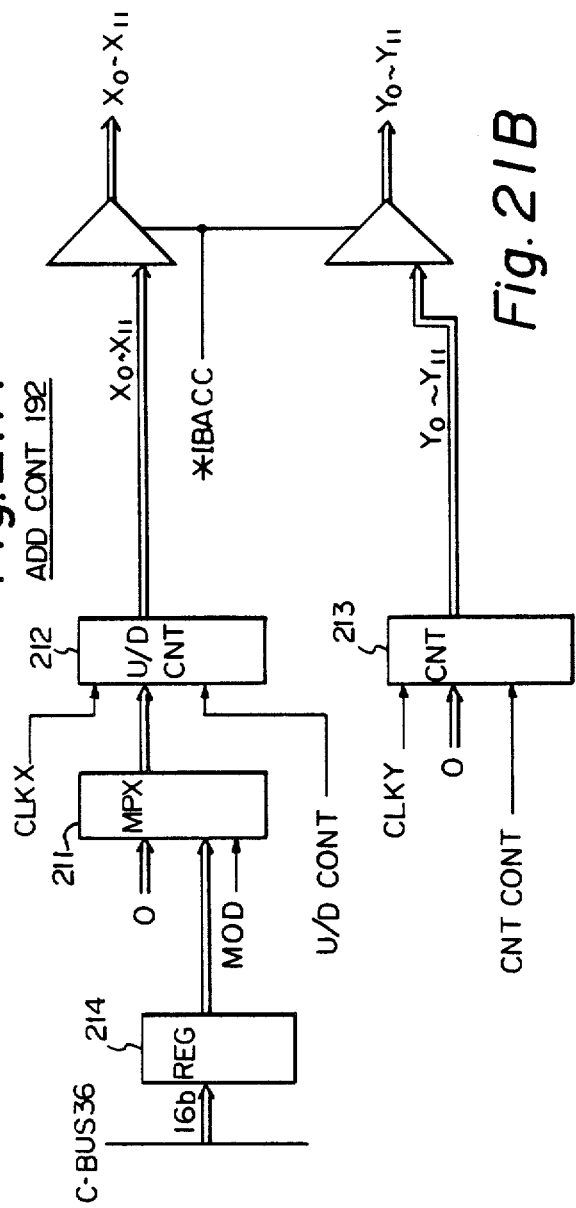
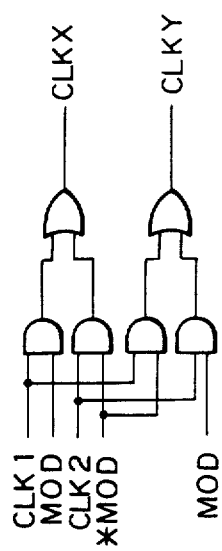

MEMORY ACCESS CONTROL APPARATUS HAVING EMPTY REAL ADDRESS STORING MEMORY AND LOGICAL ADDRESS/REAT ADDRESS PAIR STORING MEMORY

This is a continuation of copending application Ser. No. 704,550 filed on Feb. 22, 1985, now abandoned.

BACKGROUND OF THE INVENTION

(1) Field of the Invention

The present invention relates to a memory access control apparatus. More particularly, it relates to a memory access control apparatus capable of high speed processing and employing an improved virtual memory system, adapted to output data from a memory to a printer such as a laser printer.

(2) Description of the Related Art

A related art is disclosed in Japanese Patent Application No. 58-117405, filed on June 29, 1984, in which a laser printer, for example, is required to continuously print out image data at a high speed, and therefore, a high speed transmission of image data from an image memory to the laser printer is necessary.

Conventionally, in order to continuously read image data, two image memories are provided. Here, while one of the image memories is storing one page of image data, another one page of image data is read from the other image memory. This constitution, however, requires two image memories for simultaneously storing and reading two pages of image data, with the result that memory capacity as a whole must be made large.

It is possible to provide an image memory having a capacity for storing just one page of image data, and new image data may be sequentially written into an area from which the previous image data has been read. This constitution, however, cannot provide a high reading speed when the written image data is not written in sequence from the top to the bottom of the page, as later described in more detail with reference to the drawings.

SUMMARY OF THE INVENTION

Accordingly, an object of the present invention is to provide a memory access control apparatus with a decreased memory storing capacity, without deteriorating the reading speed.

Another object of the present invention is to provide a memory access control apparatus in which a single image memory plane can be used for simultaneous reading and writing of different pages even when writing is effected out of sequence.

To attain the above objects, there is provided according to one aspect of the present invention, a memory access control apparatus comprising a memory having a memory capacity equal to a plurality of transfer units of data, a writing circuit for writing data into the memory in a logical address sequence different from a reading logical address sequence effected for reading the data from the memory, and a reading circuit for reading data from the memory in a logical address sequence different from the memory in a logical address sequence different from a logical address writing sequence effected for writing the data into the memory. The memory access control apparatus also includes an address detecting circuit for detecting a real address at which the read data has been stored in the memory, a correspondence storing circuit for storing a correspondence between a real address at which a transfer unit of data is being stored in the memory and the corresponding logical address used to write the transfer unit of data and a control circuit for controlling the writing circuit so as to write, at a real address detected by the address detecting citcuit, a next transfer unit of data after the transfer unit of data previously stored at the real address has been read, by specifying the corresponding logical address stored in the correspondence storing circuit.

The memory has a real address space to cover one page of printing paper, and the correspondence storing circuit has a logical space to cover at least two pages of printing paper.

The correspondence storing circuit comprises, at each logical address, a correspondence establishing bit indicating whether or not the correspondence is established. The correspondence establishing bit is turned on after the transfer unit of data is written into the memory. The correspondence establishing bit is turned off after the transfer unit of data is read. A new real address is made to correspond to the logical address at which the correspondence establishing bit is turned off.

The address detecting circuit is a first-in/first-out circuit for storing the read real address after the transfer unit of data is read from the real address, and for outputting the read real address. The output read real address is made to correspond to a specified logical address at which the correspondence establishing bit is turned off.

The correspondence storing circuit comprises, at each logical address, a correspondence inhibiting bit indicating whether or not the logical address is permitted to correspond to a real address.

The control circuit comprises a blank signal generating circuit for generating white area data so as to print out a white space when the correspondence inhibiting bit is in an ON state during a reading operation, or when the correspondence establishing bit is in an OFF state during a reading operation.

The writing circuit and the reading circuit further comprise an address conversion circuit for converting the write address or the read address into a lateral accessing address or a vertical accessing address.

BRIEF DESCRIPTION OF THE DRAWINGS

The above objects and features of the present invention will be more apparent from the following description of the preferred embodiment with reference to the accompanying drawings, wherein:

FIG. 5B is a data format of an instruction code transferred from a central processing unit (CPU) shown in FIG. 1 to a control processor (CTP) shown in FIG. 4;

FIG. 5C is a data format in a form-control buffer (FCB) shown in FIG. 4;

FIG. 8A is a flow chart explaining the write control operation;

FIG. 21A is a circuit diagram of the address control circuit in FIG. 19; and

FIG. 21B is a logic circuit diagram of a circuit for generating clock signals CLKX and CLKY.

DESCRIPTION OF THE PREFERRED EMBODIMENT

Figure 1:
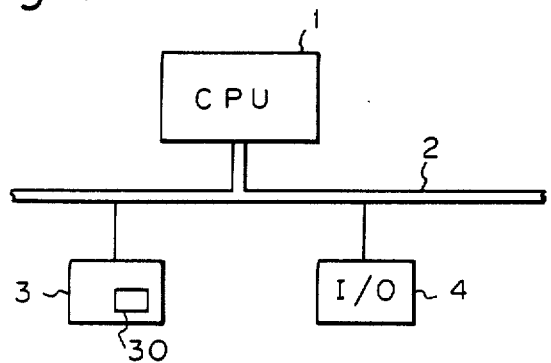
FIG. 1 is a block diagram of a data processing system for explaining the background of the present invention.

FIG. 1 is a data processing system for explaining the background of the present invention. In FIG. 1, the data processing system includes a host central processing unit (CPU) 1, a main channel 2, an image memory control device 3, and an input/output unit (I/O) 4 such as a display unit. The image memory control device 3 includes an image memory 30 pertaining to the present invention and a printer (not shown in FIG. 1). The CPU 1 communicates through the main channel 2 with the image memory control device 3 or I/O unit 4. Character data of characters to be printed out from the image memory control device 3 or certain instructions for operating the image memory control device 3 are generated from the CPU 1 and are transferred through the channel 2 to the image memory control device 3.

The image memory functions as a data buffer for transferring one page of image data to be output to a printer assembly (not shown in FIG. 1). The image memory 30 is a specific system in which it is a modification of a virtual memory as will be described later in more detail.

Figure 2:
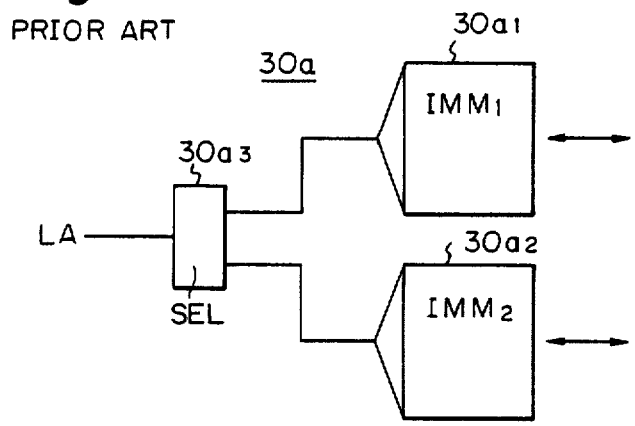
FIG. 2 is a block diagram of an example of a conventional image memory control device.

FIG. 2 is an example of a conventional image memory control device. In FIG. 2, the conventional image memory control device includes two image memories (IMM$_1$ and IMM$_2$) 30a1 and 30a2, and a selector (SEL) 30a3. Each of the two image memories 30a1 and 30a2 has a capacity for storing one page of image data. During the reading of one page of image data from the first image memory 30a1 to a laser printer, for example, the selector selects the second image memory 30a2 for a writing operation. In the writing operation, the second image memory 30a2 is accessed for writing one page of data therein by specifying logical addresses LA corresponding to the logical address space of the second image memory 30a2. Similarly, during the reading operation of the second image memory 30a2, the selector selects the first image memory 30a1 for writing the next one page of image data. This constitution ensures a high speed reading operation because the image data can be continuously read without stoppage due to a write operation.

The above-mentioned conventional device, however, requires two image memories, or two pages of memory capacity, resulting in a disadvantage of necessitating a large memory capacity.

Figure 3A:
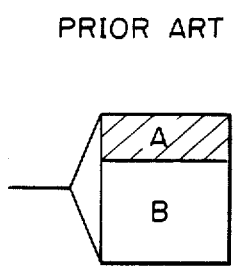
FIGS. 3A and 3B show a logical space of an image memory and an example of a picture to be printed out, for explaining a in the conventional image memory control device problem.
Figure 3B:
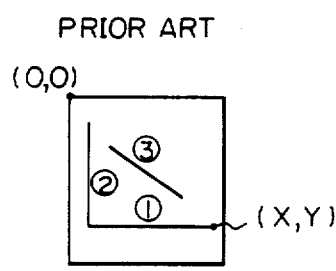

In order to reduce the memory capacity, a single image memory having a memory capacity of one page may be provided as shown in FIG. 3A. In FIG. 3A, a portion A indicated by slash lines represents a logical space where image data has been read so that this portion A can be used to write data, and a portion B represents a logical space from which image data has not been read. If write data is written sequentially from the top to the bottom of the logical space, the single image memory can store data simultaneously with the reading operation. However, the logical addresses of the write data are not always supplied sequentially from the top to the bottom of the logical space. Assume an example, as shown in FIG. 3B, wherein image data of an X axis ① is at first written into the image memory, and then, image data of Y axis ② is written, and, finally, image data of a line ③ is written. Then, the image data of the X axis can be written into the image memory only after the reading operation is finished from the top logical address (O, O) of the logical space to the end logical address (X, Y) of the X axis. Therefore, simultaneous writing and reading operations cannot always be carried out. In this case, the next reading operation must often be started only after writing one page of image data. As a result, a continuous reading operation cannot be effected by this single image memory.

Figure 4:
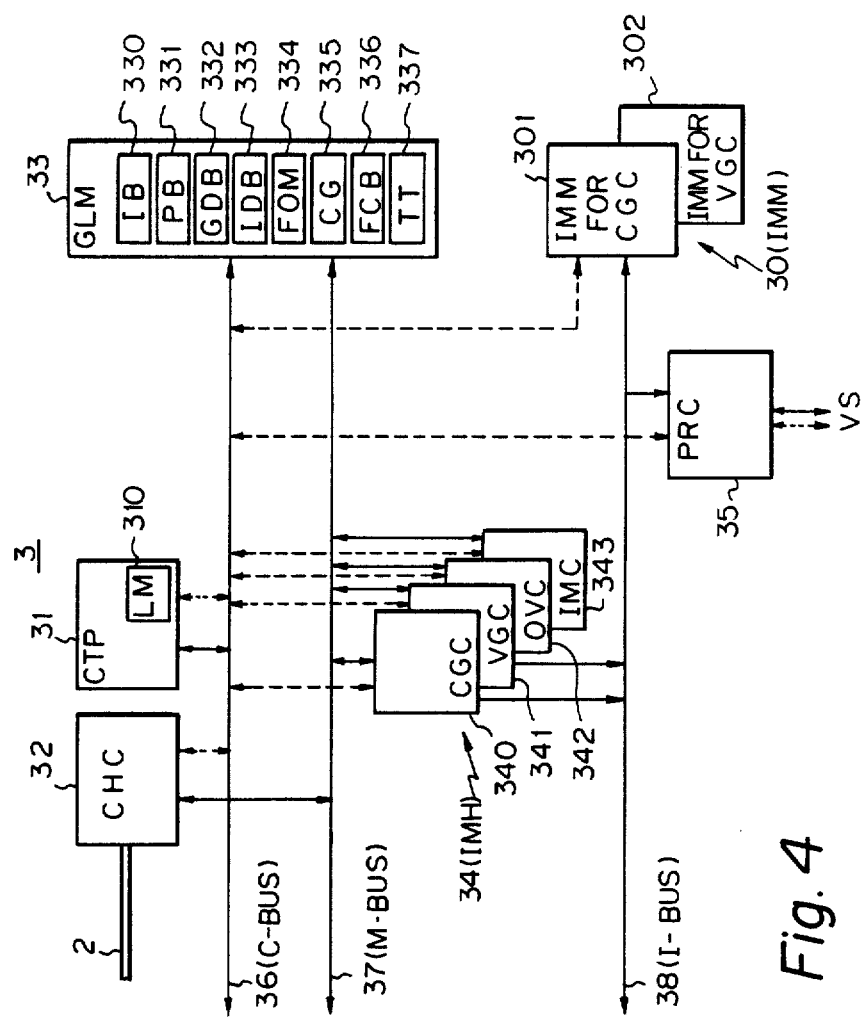
FIG. 4 is a block diagram of an image memory control device to be adapted to the present invention.

FIG. 4 is a block diagram generally showing the image memory control device 3 (FIG. 1) to be adapted to the present invention. In FIG. 4, the image memory control device 3 includes the image memory 30 (FIG. 1), a control processor (CTP) 31, a channel controller (CHC) 32, a global memory (GLM) 33, an imaging hardware (IMH) 34, a print controller (PRC) 35, a control bus (C-BUS) 36, a memory bus (M-BUS) 37, and an image data bus (I-BUS) 38. Dash lines in FIG. 4 represent paths for transferring control signals. Solid lines represent paths for transferring data.

The CTP 31 includes a local memory (LM) 310 consisting of a read only memory (ROM) and a random access memory (RAM) for storing a control program. The RAM also functions as a work area. The CTP 31 controls the whole of the device 3 and also carries out preprocessing for the IMH 34. The CTG may be realized by a microprocessor.

The CHC 32 is connected through the main channel 2 (FIG. 1) to the CPU 1 (FIG. 1), and carries out a transfer operation of character data or graphic data from the CPU 1 to the GLM 33 by a direct memory access method (DMA).

The GLM 33 includes an intermediate buffer (IB) 330, a page buffer (PB) 331, a graph data buffer (GDB) 332, an image data buffer (IDB) 333, a form overlay memory (FOM) 334, a character generating memory (CG) 335, a form control buffer (FCB) 336, and a character translation table (TT) 337, some of which are described later in more detail. The GLM 33 has a memory capacity of, for example, 0.5 megabytes through 2.5 megabytes.

The IMH 34 includes hardware for converting code data or compacted data stored in the GLM 33 into bit pattern data, and for writing the bit pattern data into the IMM 30, under the control of the CTP 31. The IMH 34 includes a character generator controller (CGC) 340, a vector generator controller (VGC) 341, an overlay pattern controller (OVC) 342, and an image generator controller (IMC) 343.

The CGC 340 is indispensable to and is always provided in the IMH 34. The CGC 340 has a function of imaging character codes stored in the CG 335 in the GLM 33. Each of the character codes is obtained by converting a character data transferred from the CPU 1 (FIG. 1). into an internal expression, i.e., a code of four bytes per character. The character codes are supplied from the CG 335 in the GLM 33 through the M-BUS 37 to the CGC 340 by DMA when the CTP 31 activates the CGC 340. The other controllers, i.e., VGC 341, OVC 342, and IMC 342, are optionally provided.

The VGC 341 has a function of imaging graphic data codes stored in the GDB 332 in the GLM 33. The data supplied to the VGC 341 are graphic codes which are obtained by converting graphic data transferred from the host CPU 1 (FIG. 1) into an internal expression. The VGC 341 also accesses the GDB 332 in the GLM 33 through the M-BUS 37 by DMA when the CTP 31 activates the VGC 341.

The OVC 342 has a function of restoring compressed overlay data, and the IMC 343 has a function of restoring compressed image data.

The C-BUS 36 is a bus which conforms with the CTP 31. As an example, the C-BUS 36 consists of a 24-bit address bus and a 16-bit data bus. All of the memories and registers in the image memory control device 3 can be mapped within the address space of the C-BUS 36. The C-BUS 36 can transfer 8-bit data or 16-bit data.

The M-BUS 37 is a bus used only for DMA from the GLM 33 to the IMH 34, and can operate independently from the C-BUS 36. The M-BUS 37 consists of, for example, a 24-bit address bus and a 16-bit data bus. The M-BUS 37 always transfers 16-bit data.

The IMM 30 is a memory for storing image data output from the IMH 34. The image data output from thee IMM 34 is bit pattern data. In order to realize a continuous printing, the IMM 30 has a specific hardware, according to the present invention, functioning as an address conversion for realizing two pages of logical memories in spite of using only one page of a real memory. The IMM 30 consists of, as an example, two memory planes (IMM) 301 and 302. The first memory plane 301 is used for two pages of character image data developed by the CGC 340. The second memory plane 302 is optionally provided and is used for two pages of graphic image data developed by the VGC 341.

The PRC 35 controls an interface between the IMM 30 and a printing assembly (not shown in FIG. 4). Synchronously with a printing process timing in the printing assembly, the PRC 35 transfers the image data from the IMM 30 to the printing assembly. When the IMM 30 consists of two memory planes, the PRC 35 should be a larger size.

The operation of the image memory control device 3 shown in FIG. 4 is as follows. The CHC 32 receives character data from the host CPU 1 (FIG. 1) and then transfers it through the M-BUS 37 to the GLM 33 by DMA. The CTP 31 supervises this data transfer as well as forms the contents of the PB 331 in accordance with the received character data. Once one page of contents is formed in the PB 331, the CTP 31 generates an instruction to the CGC 340 so that the CGC 340 receives the character codes from the PB 331 and develops a bit pattern of the character data. The IMM 301 then stores the developed bit pattern of image data. When the development of the bit pattern is finished, the CGC 340 informs the CTP 31 that the development is ended. Then, the CTP 31 generates an instruction to the PRC 35 so as to read data from the IMM 301. In response to the instruction, the PRC 35 reads data from the IMM 301 and outputs it as video signals VS synchronously with the operation of the printing assembly.

Simultaneous with the read and output operation of the PRC 35 for outputting the video signals VS, the next page of contents is formed in the PB 331; the CGC 340 develops a bit pattern of the next page of the character data; and the IMM 301 stores the next page of the developed bit pattern, in a manner similar to the above-mentioned operation for the first page.

When graphic data is transferred from the host CPU 1, the CTP 31 activates the VGC 341 after one page of graphic data is stored in the PB 331 so that the VGC 341 develops a bit pattern of one page of the graphic data. The IMM 302 then receives the bit pattern of the graphic data. The simultaneous operation of reading the first page of the graphic data from the IMM 302 and storing the next page of the graphic data in the IMM 302 is similar to the operation for the character data.

When the character data and the graphic data are to be printed out on a same page, the PRC 35 takes a logical OR of the outputs from the IMMs 301 and 302.

A more detailed operation of the device 3 shown in FIG. 4 will be described with reference to FIGS. 5A through 5F.

Figure 5A:
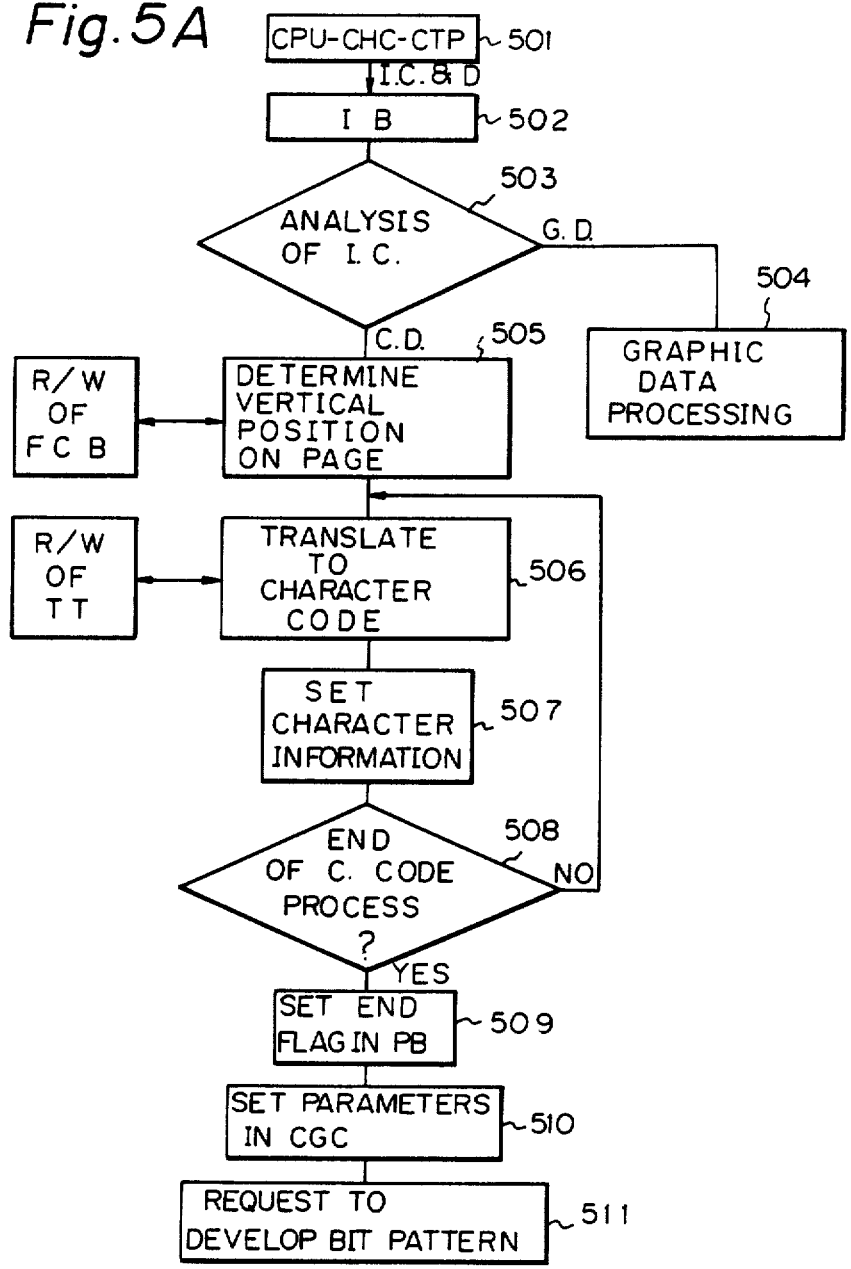
FIG. 5A is a flow chart for explaining a data flow from a channel controller (CHC) to an imaging hardware (IMH) in the device shown in FIG. 4.

FIG. 5A is a flow chart for explaining the data flow from the CHC 32 to the IMH 34 in the device 3 shown in FIG. 4. Referring to FIGS. 4 and 5A, at step 501, the CTP 31 receives an instruction code IC and data D from the CPU 1 through the CHC 32. The instruction code IC has a format shown, as an example, in FIG. 5B. The instruction code in this example consists of one byte, i.e., 8 bits from 0 through 7. The main contents of the instruction code indicate whether the data from the CPU 1 is character data CD or graphic data GD, or issues an instruction to form the contents of the FCB 336 (FIG. 4) which determines the vertical position and the line pitch on a page when the data from the CPU 1 is the character data. In FIG. 5B, when only the most significant bit 7 in the high order four bits is "1", the instruction code indicates that the data from the CPU 1 is character data. In this case, the low order four bits 0 through 3 represent a channel number CH.NO, which determines a line on a page, i.e., the vertical position of the character to be printed out on a page. When only the next significant bit 6 is "1", the instruction code indicates that the data from the CPU 1 is graphic data. When only the bit 6 is "1", the instruction code issues an instruction to form the FCB 334. An instruction code having another bit pattern can issue an instruction to operate the printer assembly.

At step 502, the CTP 31 stores the data from the CPU 1 in the IB 330 in the GLM 33 without any modification of the received data.

At step 503, the CTP 31 analyses the instruction code IC so as to determine whether the data is character data CD or graphic data GD.

If the received data is graphic data GD, then at step 504, graphic data processing is carried out by a graphic generator including the GDB 332, the VGC 341, and the IMM 302.

If the received data is character data CD, then, at step 505, the vertical position of the character to be printed out on a line of one page is determined with reference to the FCB 334 based on the received instruction code.

The format of the FCB 334 is shown as an example in FIG. 5C. The contents of the FCB 334 are previously determined in accordance with the desired printing format. Assume that the length of one page 50 is 12 inches, and that the minimum line pitch between adjacent lines is 12 lines/inch. Then the maximum line number on one page is 144 lines, 0 through 143. Accordingly, the FCB 334, which determines the vertical position of each line on the page, consists, at maximum, of 144 columns "0" through "143", each column corresponding to one line on the page 50. Each column in the FCB 334 consists of a line pitch control data LP indicating the line pitch and a channel number CH.NO. indicating a line to be skipped. The channel number CH.NO is one of "0" through "12". The same channel numbers may be provided in different columns in accordance with the desired printing format. The CTP 31 counts up the number of times the same channel numbers are received. For example, when the instruction code specified at first the channel number "1" in the FCB 334 shown in FIG. 5C, the CTP 31 searches, starting from the column "0", the first "1" of the channel number. Since the first channel number "1" is stored in column "3" in this example, the CTP 31 moves its pointer to control the line "3". Then, assume that the instruction code specifies the channel number "1" again, the CTP 31 searches the second "1" of the channel number. The second channel number "1" is stored in the column "5". Therefore, the CTP 31 skips its pointer from the column "3" to the column "5". If the next instruction code specifies the channel number "7", the CTP 31 moves its pointer from the column "5" to the column "143" if the columns "0" through "142" do not store the channel number "7".

The line pitch LP is one of "0", "1", and "2", which respectively represent that the pitch between adjacent lines are 6 lines/inch, 8 lines/inch, and 12 lines/inch. Assume that the resolution of the printer is 240 dots/inch. Then the character data on the first line "0", if specified by the instruction code is developed at the position vertically lower by 40 dots from the top of the page, because the first column "0" contains the line pitch "0", i.e., 6 lines/inch, and therefore, one line needs 40 dots in the vertical direction. Also, the character data on the second line "1", if specified by the instruction code, is developed at the position vertically lower by 30 dots from the first line "0", because the second column "1" contains the line pitch "1", i.e., 8 lines/inch, and therefore, one line needs 30 dots in the vertical direction.

Referring back to FIGS. 4 and 5A, after the step 505, the CTP 31 reads the character data byte by byte from the IB 330 in the GLM 33. The read data is processed as a hexadecimal Extended Binary-Coded Decimal Interchange Code (EBCDIC) of a character code. That is, at step 506, the read character code is translated into a top address of the character pattern stored in the CG 335 of the GLM 33, with reference to the character translation table (TT) 337 in the GLM 33.

Figures 5D, 5E, 5F:
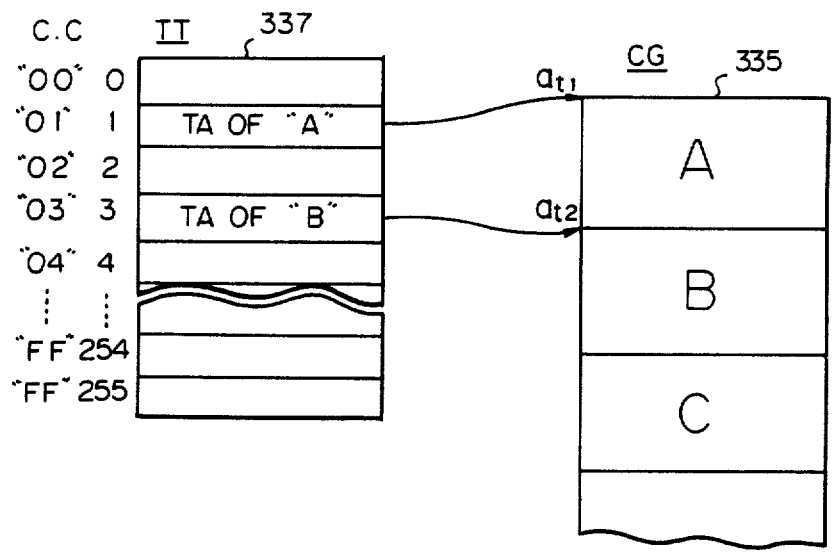
FIG. 5D shows a process of the translation of a character code into the corresponding top address of the character.
FIG. 5E is a data format in a page buffer (PB) shown in FIG. 4.
FIG. 5F is a diagram of a start position of each character.

The relationship between the CG 335 and the TT 337 is shown in FIG. 5D. In FIG. 5D, the TT consists of 256 columns. Each column stores the top address of a character pattern corresponding to the character code (EBCDIC). The CG 335 stores character patterns for characters A, B, C, . . . . As an example, when a character code C.C. of "01" in the hexadecimal expression is read from the IB 330, the CTP 31 searches the column "1" of the TT 367, with the result that the top address TA=$a_{t1}$ of the character "A" is identified. The identified top address $a_{t1}$ is stored at step 507, in the PB 331. Similarly, when a character code of "03" is specified, the top address TA=$a_{t2}$ of the character "B" is identified and stored at step 507, in the PB 331.

FIG. 5E shows the format of the page buffer (PB) 331. In FIG. 5E, other than the above-mentioned top addresses TA of the character patterns, movement amounts MA in the horizontal direction and addresses PMDA for accessing a printing-data memory (see FIG. 6) in the CGC 371 are also stored at step 507, in the PB 331. The printing-data memory will be described later in more detail.

The movement amounts MA are explained with reference to FIG. 5F. As shown in FIG. 5F, the movement amounts are the distances from the print start positions of characters on a page in the horizontal direction. The print start position for each line on a page is stored in the printing-data memory. For example, in FIG. 5F, the movement amount for the character "A" is "0"; the movement amount for the character "B" is "$S_1$"; and the movement amount for the character "C" is "$S_2$". When the size of a character in the horizontal direction is defined as 10 characters/inch, and when the resolution is 240 dots/inch, then the distance in the horizontal direction between a start address of one character and a start address of the next character is 24 dots. In this case, $S_1$ is 24 and $S_2$ is 48.

After all of the character codes for one page are processed, by repeating the steps 506 to 508 in the manner mentioned above, the CTP 31 sets, at step 509, an end flag EF in the PB 331. In this state, the PB 331 stores the character information for all characters to be printed on one page, including the movement amounts MA, the top addresses TA of the character patterns, and the addresses PMDA for accessing the printing-data memory.

Then, at step 510, the CTP 31 sets the necessary parameters in the CGC 340. These parameters are necessary for developing the character data into a bit pattern data.

Finally, at step 511, the CTP 31 requests the CGC 340 to develop the character data into bit pattern data.

The CGC 340 then starts to operate.

Figure 6:
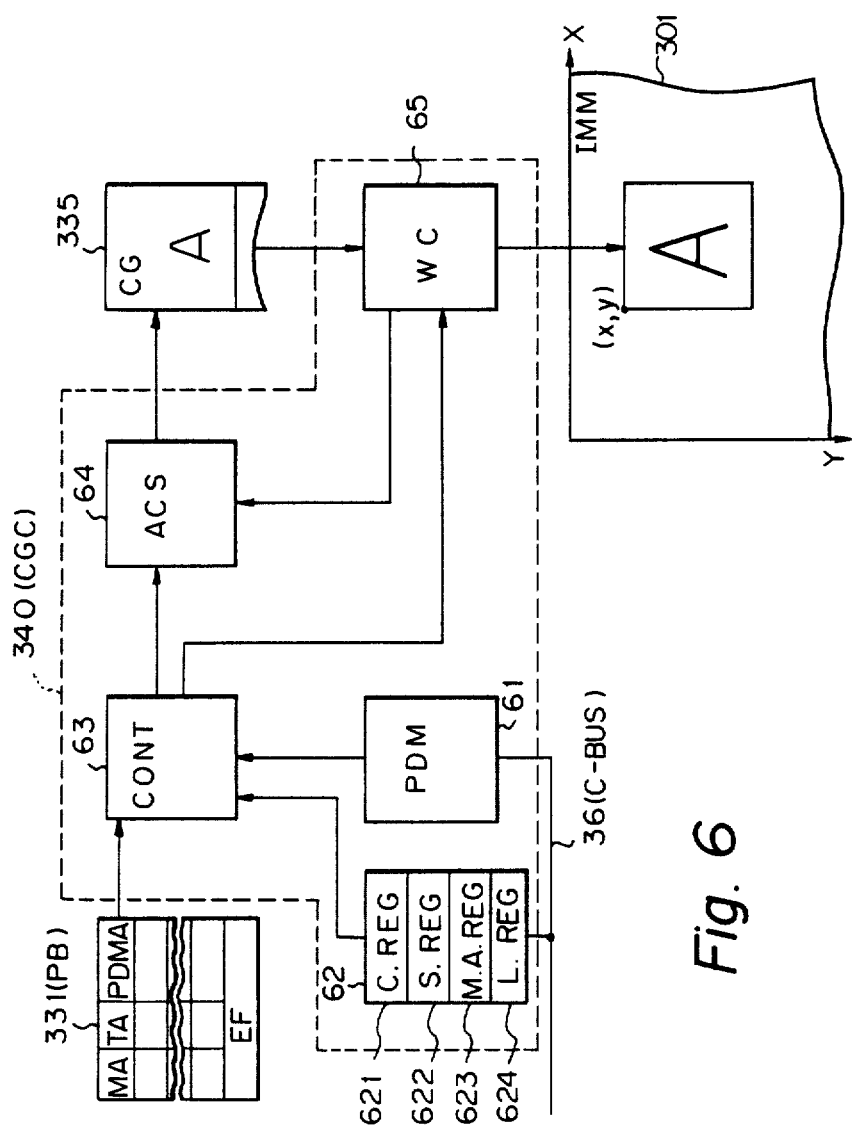
FIG. 6 is a block diagram of a character generator controller (CGC) shown in FIG. 4.

FIG. 6 shows a block diagram of the CGC 340 in the device 3 shown in FIG. 4. In FIG. 6, the CGC 340 includes the printing-data memory (PDM) 61 as mentioned before, a control register 62, a CGC controller (CONT) 63, a CG access circuit (ACS) 64, and a write circuit (WC) 65.

The PDM 61 and the control register 62 store necessary parameters as described before with reference to FIGS. 5A and 5E, and in particular, at step 510 in FIG. 5A. More specifically, the PDM 61 stores starting addresses of respective lines to be printed on one page, and a plurality of character parameters including a flag indicating whether the character to be printed should be rotated or not, a width, and a height, for each character. The control register 62 includes a command register (C.REG) 621 for storing a start command for starting the operation of the CGC 340, a status register (S.REG) 622 for storing a status data of the CGC 340, a memory address register (MA.REG) 623 for indicating a top address TA in the PB 331, and a line address register (L.REG) 624 for storing a vertical position (see FCB in FIG. 5C) of the character to be printed. These data in the PDM 61 and in the control register 62 are set under the control of the CTP 31 in the device 3 shown in FIG. 4.

After the CTP 31 sets the contents of the PB 331, provides the data in the PDM 61, sets the top address of the PB 331 in the M.A. REG 623, and sets the vertical position in the L.REG 624, it then writes a start command into the command register 621. In response to the start command from the command register 621, the CONT 63 starts to operate as follows.

(1) By using the top address of the PB 331 stored in the memory address register 623, the CONT 63 reads the data stored in the PB 331. The PB 331 has previously stored the data including the top addresses TA of the character patterns in the CG 335, the movement amounts MA, and the addresses of the PDM 61, for one page, as described before with reference to FIGS. 5D, 5E, and 5F. The data read from the PB 331 includes the same top address TA as the top address transferred from the memory address register 623.

(2) The top address TA read from the PB 331 is transferred through the CONT 63 to the ACS 64.

The CONT 63 calculates the position of the character to be written, based on the data of the starting address of a line stored in the PDM 61 and the movement amount MA included in the data read from the PB 331.

Further, by using the address PDMA of the PDM 61, the address being included in the data read from the PB 331, the CONT 63 reads the corresponding character parameters from the PDM 61, and transfers the read character parameters to the WC 65. Then the CONT 63 activates the WC 65 to start its operation.

(3) The WC 65 then sends a CG request signal to the ACS 64. The ACS 64 then accesses the CG 335 so as to read one line of the character pattern "A", for example, specified by the data from the PB 331. The one line of the character pattern is written into the IMM 301. In the writing operation, a vertical writing or a horizontal writing is carried out as later described in more detail. After one line of the character pattern is read from the CG 335, the ACS 64 increments the address for accessing the CG 335.

(4) The operation as described in the above item (3) is repeated for each line of the character pattern. When the character pattern is completely written into the IMM 301, the WC 65 informs the CONT 63 that the writing operation of the character pattern is finished.

(5) Then, the CONT 63 again accesses the PB 331 so as to read subsequent data for the next character to be written, and the operation similar to that described above in items (1) through (4) is repeated.

The above operation is sequentially repeated until the end flag EF is read from the PB 331 to the CONT 63. When the end flag EF is read, the CONT 63 informs the CTP 31 (FIG. 4) through the status register 622 that the writing operation for one page is finished.

Figure 7:
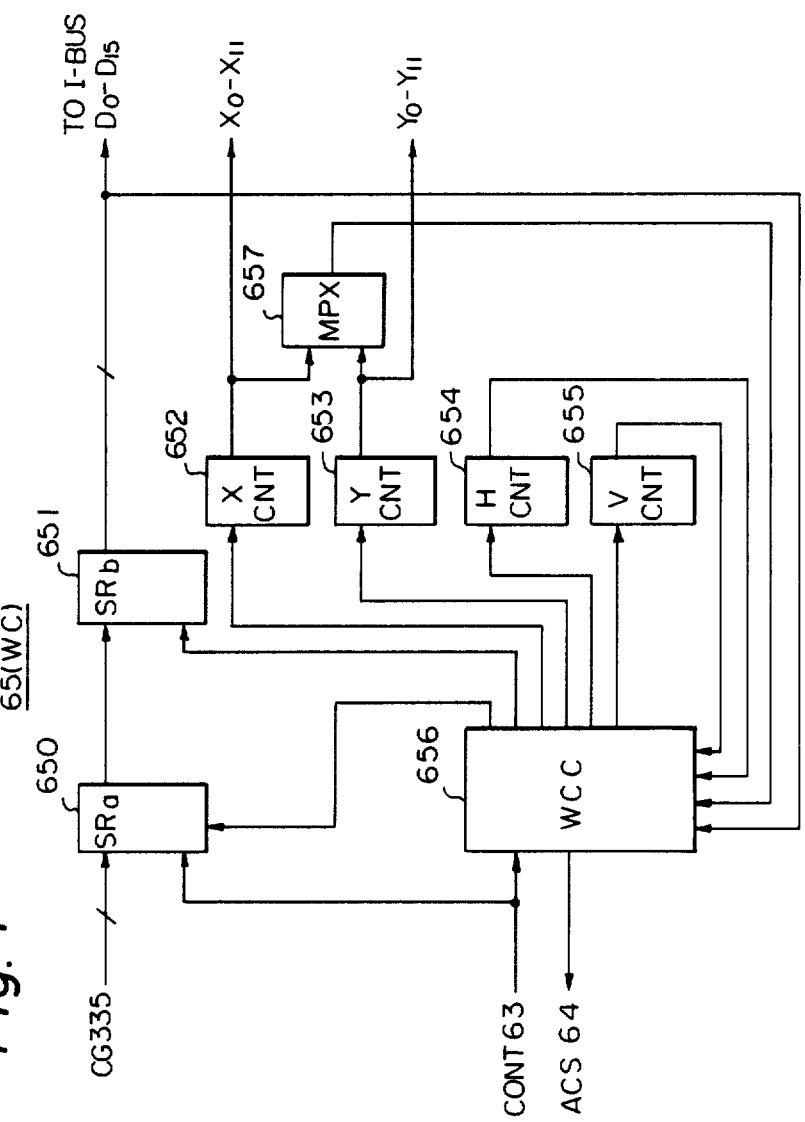
FIG. 7 is a block diagram of a write circuit (WC) shown in FIG. 6.

FIG. 7 is a diagram of the write circuit (WC) 65 included in the CGC shown in FIG. 6. In FIG. 7, the WC 65 includes a parallel-serial converting shift register (SRa) 650, a serial-parallel converting shift register (SRb) 651, an X counter 652, a Y counter 653, an H counter 654, a V counter 655, a write control circuit (WCC) 656, and a multiplexer 657. The X counter 652 is a counter for supervising the X addresses of the IMM 301; the Y counter 653 is a counter for supervising the Y addresses of the IMM 301; the H counter 654 is a counter for supervising the width of a character; and the V counter 655 is a counter for supervising the height of a character.

FIG. 8A is a flow chart for explaining the operation of the WC 656 shown in FIG. 7. In FIG. 8A, and in the following description of the operation of the WC 656, a horizontal accessing process is mainly described. In the flow chart, all vertical accessing processes are placed within parentheses. The operation is carried out in the following sequence.

(1) At start-up, after the WCC 656 has received, from the CONT 63 (FIG. 6), a writing position $X_1$ and $Y_1$ ($X_2$ and $Y_2$ in a vertical accessing), a width H, and a height V of a character to be printed, and after the CONT 63 has activated the WC 656 to start its operation, then at step 801, the WC 656 sets these values $X_1$, $Y_1$, H and V in the X, Y, H, and V counters 652 through 655, respectively.

(2) When the SRa 650 is recognized as being empty by the WCC 656, then at step 802, it sends a request signal REQ to the ACS 64 (FIG. 6) requesting character cata in the CG 335.

(3) At step 803, the WCC 656 delays its operation until 16 bits of the read character data are set in the SRa 650. When the read data is set in the SRa 650, the address of the ACS 64 (FIG. 6) for accessing the CG 335 is incremented.

(4) At step 804, the WCC 656 clears the SRb 651.

(5) At step 805, one bit of data serially output from the SRa 650 is shifted into the SRb 651 under the control of the WCC 656.

(6) At step 806, the WC 656 increments the X counter 652 (decrements the Y counter 653), and decrements the H counter 654.

(7) At step 807, the WCC 656 discriminates whether or not the SRb 651 is full of data, i.e., whether or not the low order four bits of the X counter 652 are all "1" in the horizontal accessing process. That is, the WCC 656 discriminates whether or not 16 bits of data, i.e., one data unit, which is an accessing unit for accessing the IMM 301, is shifted into the SRb 651. Also at step 807 also, the WCC 656 discriminates whether or not the H counter 654 is empty, i.e., whether or not the amount of data transferred from the CG 335 reaches the full width H of the character.

If both answers are "NO", then, the steps 805 through 807 are repeated.

If at least one of the answers is "YES", then step 808 is executed.

(8) At step 808, the WCC 656 discriminates whether or not the contents in the SRb 651f are all "0". If the contents are all "0", no accessing for writing is carried out, and the process goes to the step 814. Since no writing operation is carried out when the SRb 651 contents are all "0", a high speed processing is realized when the character pattern includes a large white area. If the SRb 651 contains at least one bit of "1", then step 809 is executed.

(9) At step 809, the WCC 656 generates a request signal REQ for memory write accessing. The request signal REQ is supplied to the IMM 301.

(10) At step 810, the WCC 656 waits until an access permission signal ACK is transferred form the IMM 301. This waiting is necessary only if another device is using the I-BUS 38 (FIG. 4).

(11) At step 811, the data $D_0$ through $D_{15}$ in the SRb 651, the data $X_0$ through $X_{11}$ in the X counter 652, and the data $Y_0$ through $Y_{11}$ in the Y counter 653 are transferred through the I-BUS 38 to the IMM 301. Thus, $16 \times 1$ bits of data are written into the IMM 301 at a logical writing address based on the data $X_0$ through $X_{11}$ and $Y_0$ through $Y_{11}$, as later described in more detail. If, however, none of the logical address are opened for the writing operation, as will be later described in detail, then the logical writing address cannot be determined until at least one logical address is opened for writing. In this case, the IMM 301 generates a rejection signal.

(12) At step 812, the WCC 656 discriminates whether or not the reject signal is transferred from the IMM 301. If transferred, the process goes to step 813; if not, the process goes to step 814.

(13) At step 813, the process stops for an appropriate time period to avoid the occupation of the I-VUS 38. After that time period, the steps 810 through 812 are repeated.

(14) At step 814, the WCC 656 discriminates whether or not the H counter is empty. If one line of the character is not processed, the process then goes to step 804.

(15) If one line of the character has been processed, the process goes to step 815. The WCC 656 discriminates whether or not the V counter 655 is empty. If empty, the character has been completely written into the IMM 301. If not empty, the process goes to step 816.

(16) At step 816, for the next line in the character, the X counter (Y counter) and the H counter are reset, the Y counter (X counter) is incremented, and the V counter is decremented. Then, the process goes to step 802.

Figure 8B:
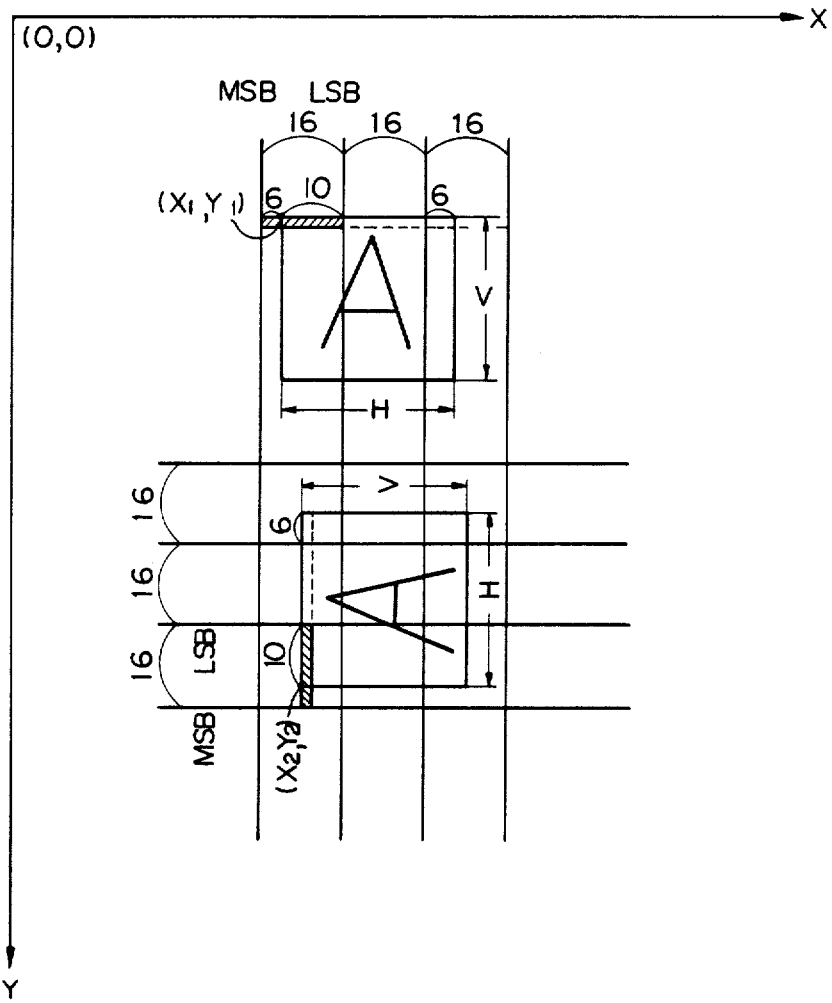
FIG. 8B is a diagram explaining a lateral access and a vertical access in the write control operation shown in FIG. 8A.

The reason why the two shift registers SRa 650 and SRb 651 are provided in the WC 65 will be understood with reference to FIG. 8B, in which write positions on the logical space of the IMM 301 are illustrated for both lateral access and the vertical access. The width H of the character A is illustrated as 32 bits. The SRa 650 at first receives 16 bits from the CG 335, as indicated by slash lines. The top address of the character pattern A is $(X_1, Y_1)$ for the lateral access or $(X_2, Y_2)$ for the vertical access. As shown in FIG. 8, the X address $X_1$ or the Y address $Y_2$ does not always coincide with the most significant bit MSB of the 16 bits. In the example, the X address $X_1$ or the Y address $Y_2$ is different from the MSB by 6 bits. Since the WCC 656 knows the X address $X_1$ or the Y address $Y_2$, the SRb 651 does not store the high order 6 bits, and only the remaining 10 bits are sequentially shifted into the SRb 651, from the higher order bit, i.e., bit 9, to the lower order bit, i.e., bit 0. Thus, the SRb 651 outputs only 10 bits at the first writing operation. Since the high order 4 bits in the received 16 bits are neglected, the operating speed is increased. In the second writing operation, all 16 bits are shifted from the SRa 650 to the SRb 651. In the third writing operation, however, only the higher order 6 bits in the received 16 bits are shifted into the SRb 651.

Figure 9:
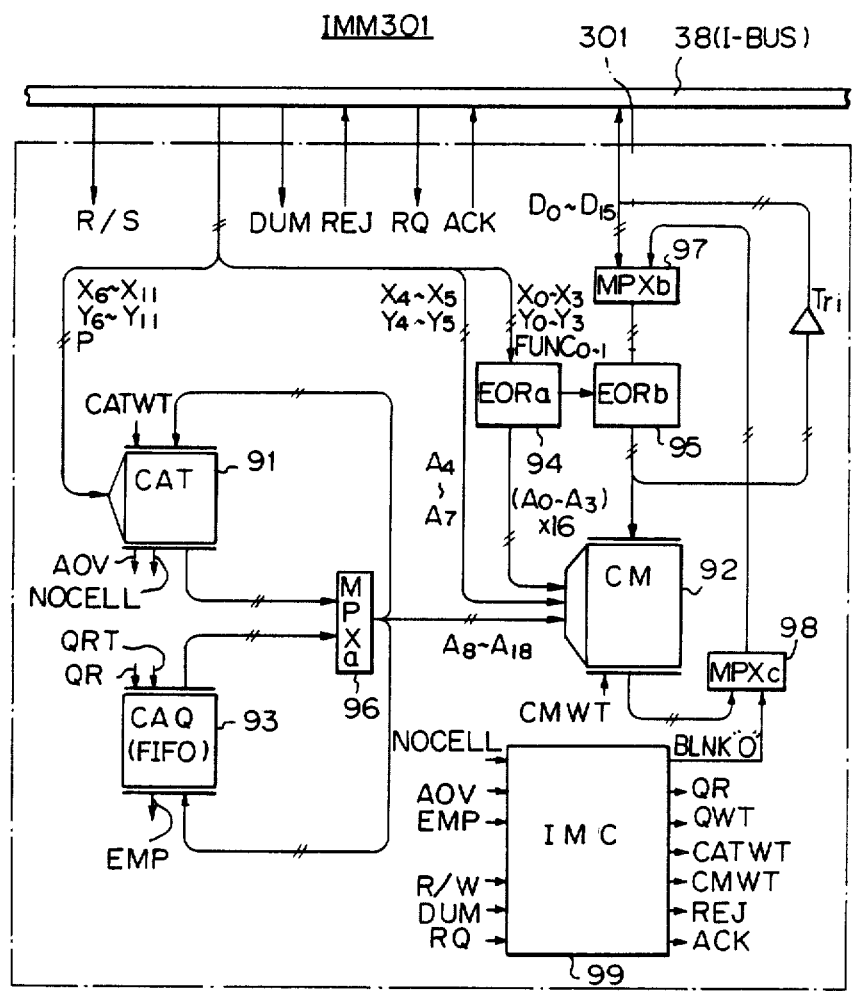
FIG. 9 is a block circuit diagram showing an image memory according to an embodiment of the present invention.

FIG. 9 is a block circuit diagram of the image memory 301 according to an embodiment of the present invention. In FIG. 9, the IMM 301 is connected to the I-BUS 38 which is used only for accessing the IMM 301 or IMM 302 (FIG. 4). The IMM 301 includes a cell address translate table (CAT) 91, a cell memory (CM) 92, a cell address queue (CAQ) 93, a first address translate circuit (EORa) 94, a second address translate circuit (EORb) 95, a first multiplexer (MPXa) 96, a second multiplexer (MPXb) 97, a third multiplexer (MPXc) 98, and an image memory control circuit (IMC) 99.

The CAT 91 is a logical memory for storing a table which is used to translate a logical address into a real address.

The CM 92 is a real memory for storing bit image data.

The CAO 93 is a "first-in first-out" (FIFO) circuit for supervising real memory cells which are not being used.

The EORa 94 and the EORb 95 are circuits for translating addresses and data sequences so as to realize lateral access, vertical access, or plane access.

$X_0$ through $X_{11}$, and $Y_0$ through $Y_{11}$ represent address lines for specifying a read or write logical address of the IMM 301 from the IMH 34 (FIG. 4). P represents an address line for specifying a page used for reading or writing.

$D_0$ through $D_{15}$ are data lines for reading from or writing in data by the IMH 34.

R/W is a signal for discriminating whether data is read from or data is written in the IMM by the IMH 34.

RQ is an access request signal from the IMH 34. ACK is an access permission signal from the IMM 301 to the IMH 34.

The other signals in FIG. 9 are described later.

Figure 10:
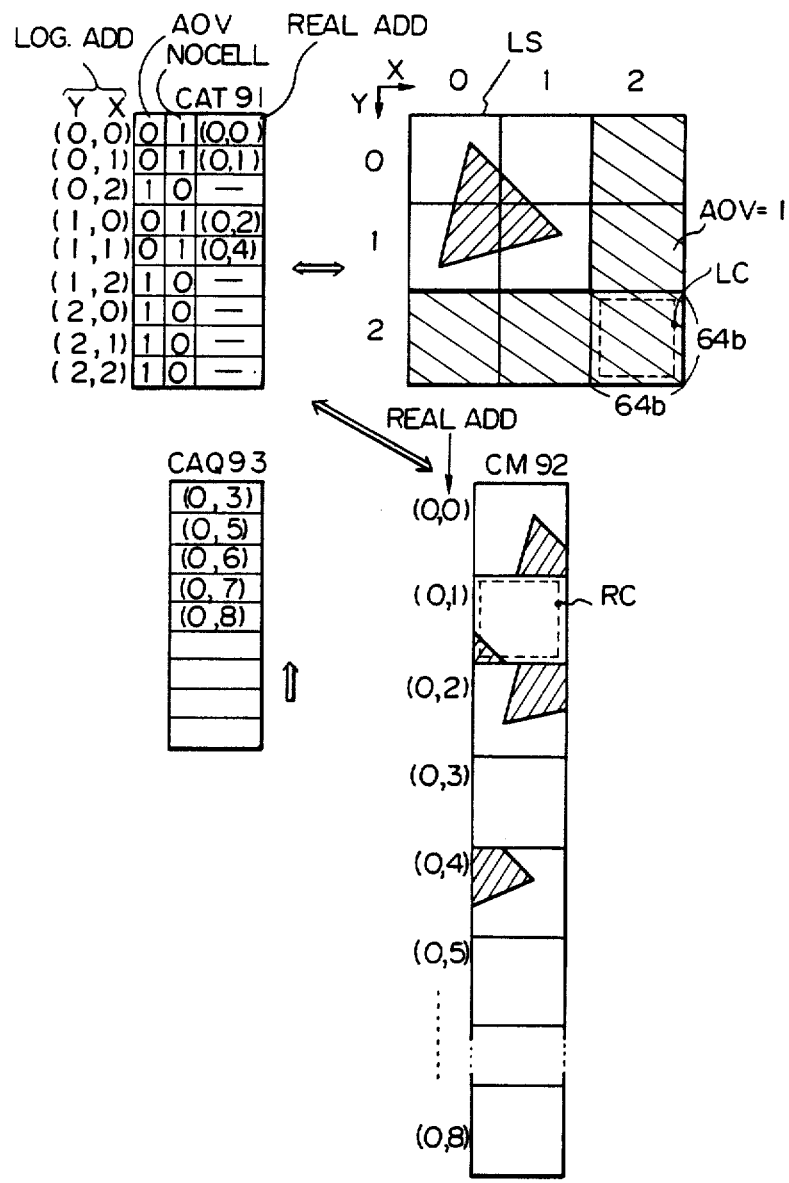
FIG. 10 is a diagram of various states of a cell address translate table (CAT), a cell memory (CM), and a cell address queue (CAQ), which are included in the image memory, and also shows a state of a logical memory corresponding to the state of the CAT.

The principal operation of the IMM 301 shown in FIG. 9 is described with reference to FIG. 10 which shows certain states of the CAT 91, the CM 92, the CAQ 93, and a logical space LS corresponding to the state of the CAT 91. For the sake of simplicity, the logical space LS in this example has only nine logical cells LC each having an address space of 64 bits × 64 bits. Each logical cell is a unit of a virtual memory. Also, the CM 82 has nine real cells RC each having the same address space of 64 bits × 64 bits as that of the logical cell LC. The logical cells LC and the real cells RC may relate to each other in one to one correspondence.

The CAT 91 has nine columns identified by logical addresses YX=00 through 22. Each column includes an AOV bit, a NOCELL bit, and a real cell address.

The AOV bit indicates whether or not the logical cell can be allocated with a logical cell address. That is, in the logical space LS, the slashed portion having logical addresses YX=02, 12, 20, 21, and 22 is shown as an example of the allocation inhibit area, such as an area near the sides of a page. Any data in this area should not be printed out. Therefore, the logical cells LS in this area cannot be allocated logical addresses. To this end, the AOV bits in the columns 02, 12, 20, 21 and 22 in the CAT 91 are labelled "1", indicating that the logical cells LS in these addresses cannot be used for write or read operations. The other columns in the CAT 91 have the AOV bits of "0".

The NOCELL bit indicates whether the correspondence is established or not between the logical cell and a real cell. In the illustrated example the logical cell having the logical address 00 corresponds to the real cell having the logical address 00; the logical cell 01 corresponds to the real cell 01; the logical cell 10 corresponds to the real cell 02; and the logical cell 11 corresponds to the real cell 04. Thus, the NOCELL bits in the columns 00, 01, 10, and 11 are labelled "1".

In this example, the CAQ 93 is a FIFO having nine columns. Each column stores a real address of a real cell which can be used to write data therein or to read data therefrom, i.e., which is not in use. The direction of data flow in the CAQ 93 is from the bottom to the top, as indicated in the figure by an arrow. The real addresses stored in the CAQ 93 can correspond to the logical addresses. In the illustrated state, since the real cells 00, 01, 02, and 04 have been made to correspond to the logical cells 00, 01, 02, and 10, respectively, the remaining real cells 03, 05, 06, 07, and 08 are free to be used for other read or write operation. Therefore, by providing another CAT in addition to the CAT 91, image data in another logical space can be written into the same CM 92.

The writing operation of two pages into a single page of the real memory is further described with reference to FIGS. 11A through 11C.

Figure 11A:
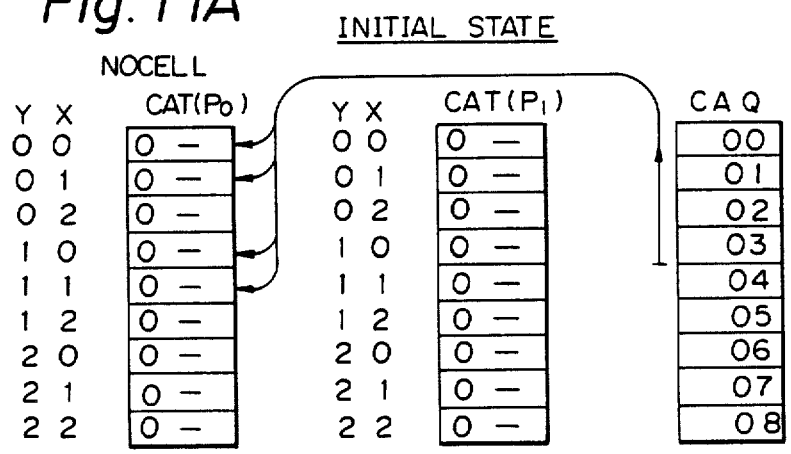
FIG. 11A is a diagram of initial states of two CATs and the CAQ.

FIG. 11A shows the initial states of two CATs, i.e., CAT ($P_0$) for the first page and CAT ($P_1$) for the second page, and the CAQ. In this state, the CAQ stores all of the real cell addresses 00 through 08. Therefore, all of the real cells can be used for the write operation. Also, NOCELL bits in the CAT ($P_0$) and CAT ($P_1$) are all "0" indicating that no logical cell corresponds to any one of the real cells, even when each column in the CAT ($P_0$) and CAT ($P_1$) stores any real address.

Figure 11B:
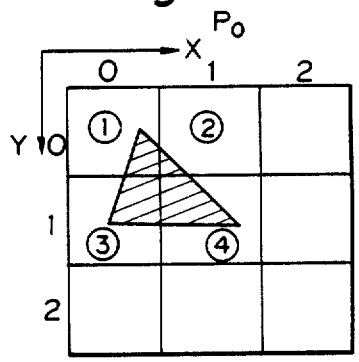
FIG. 11B shows transitional states of the two CATs and the CAQ when new data is written in one page of the logical memory.
Figure 11B:
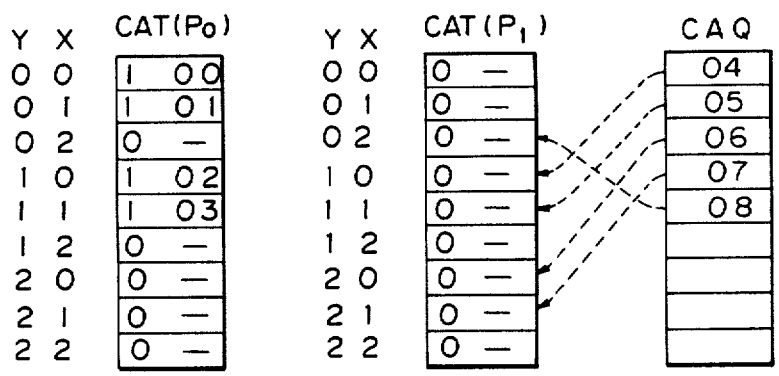

From this state shown in FIG. 11A, assume that an image data as shown in FIG. 11B is to be written on the first page $P_0$ of the logical space in a sequence from ① through ④, i.e., in a sequence of the logical addresses 00, 01, 10, and 11 of the first page $P_0$. Then, the real addresses 00, 01, 02, and 03 stored in the CAQ are sequentially output. The output real addresses are then input into the columns 00, 01, 10, and 11 of the CAT ($P_0$), as illustrated in FIG. 11A by arrows. As a result, as shown in FIG. 11B, the CAT ($P_0$) stores the real addresses 00, 01, 02, and 03 in the columns 00, 01, 10 and 11, respectively. Simultaneous with the storing operation, the NOCELL bits in these columns 00, 01, 10, and 11 are turned to "1". In this state, the columns, 02, 12, 20, 21 and 22 of the CAT ($P_0$) and all columns of the CAT ($P_1$) are free to store any real address. The CAQ stores the real addresses 04, 05, 06, 07 and 08 which are free to be used.

Figure 11C:
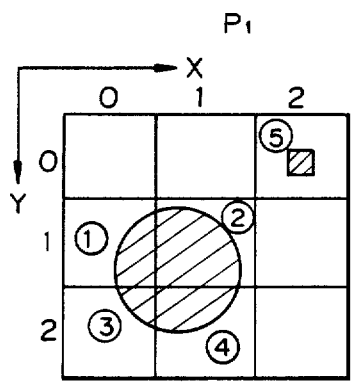
FIG. 11C is a diagram of transitional states of the two CATs, the CAQ, and the logical memory, when another new data is written in another page of the logical memory.

From the state shown in FIG. 11B, further assume that another image data as shown in FIG. 11C is to be written in the second page $P_1$ of the logical space in a sequence form ① through ⑤, i.e., in a sequence of the logical addresses 10, 11, 20, 22, and 02 of the second page $P_1$. Then, the real addresses 04 through 08 are sequentially read from the CAQ and stored in the columns 10, 11, 20, 21, and 02, respectively. Simultaneously, the NOCELL bits in these columns are changed to "1". Thus, two pages of image data are allocated to the real addresses of a single page of the CM 92.

To read the image data from the CM 92, it is sufficient to specify the logical address. The image data in the corresponding real address allocated to the logical address is then read to the printer assembly.

After reading the image data, the read real cell can be used by changing the NOCELL bit in the CAT 91. Therefore, during the reading of one page, simultaneous writing into another page is possible. As a result, a continuous reading operation from the first page to the second page becomes possible.

Further, as long as at least one real address is stored in the CAQ, and at least one column of the CAT ($P_1$) or CAT ($P_2$) has the NOCELL bit of "0", the real address can be stored in the column. Therefore, the writing of image data in the logical space is not limited to a top to bottom operation. In FIG. 11C, a circle is written in a lower portion of the logical space, and then a rectangle is written in an upper portion of the logical space.

Figure 12:
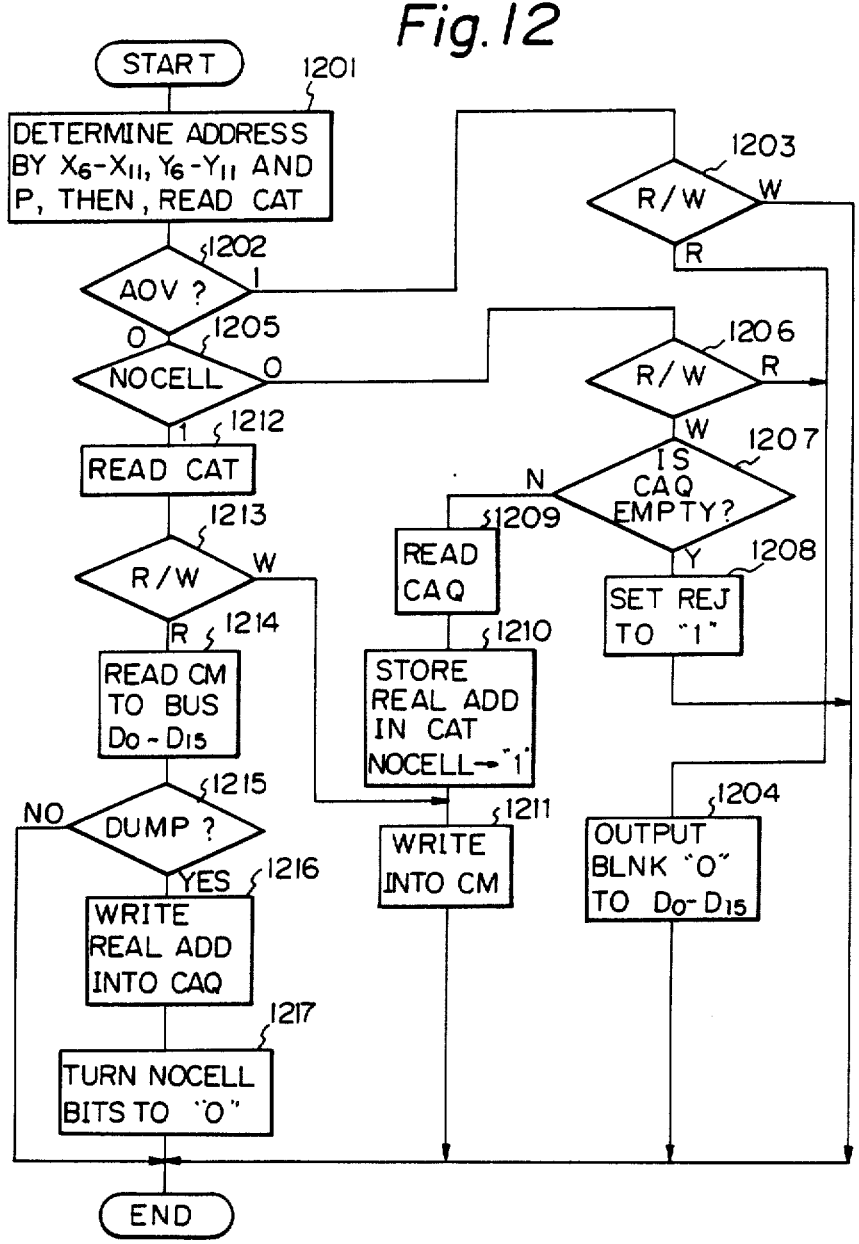
FIG. 12 is a flow chart explaining the operation of the image memory shown in FIG. 9.

FIG. 12 is a flow chart for explaining the operation of the image memory shown in FIG. 9. Referring to FIGS. 9 and 12, at step 1201, the logical address for accessing the CAT 91 is determined by the data $X_6$ through $X_{11}$, $Y_6$ through $Y_{11}$, and P. The low order five bits $X_0$ through $X_5$ and $Y_0$ through $Y_6$ are not taken into account in the description with reference to FIG. 12 because one logical cell consists of 64 bits x 64 bits. The data P represents the page $P_0$ or $P_1$. Then, by the determined logical address, the CAT 91 is accessed so that the AOV bit and the NOCELL bit corresponding to the logical address are read.

At step 1202, the IMC 99 discriminates whether the AOV bit is "1" or "0".

If the AOV bit is "1", the determined address is an inhibited area for writing. Therefore, if the IMC 99 discriminates, at step 1203, that the R/W signal from the I-BUS 38 is a write signal, no process is carried out. If the R/W signal is a read signal, then, at step 1204, the IMC 99 outputs "0" which is transferred through the multiplexers 98, 97, EORb 95, data bus $D_0$ through $D_{15}$, and the I-BUS 38, to the PRC 35 so that a white space is printed.

If the AOV bit is "0" at step 1202, IMC 99 discriminates the NOCELL bit. If the NOCELL bit is "0", this logical address can be allocated to a real address. If, at step 1206, the R/W signal is the read signal, a white space is printed at step 1204 because the real cell allocated to this logical address has been read and is not in use since the NOCELL bit is "0". If the R/W signal is the write signal, however, then at step 1207, the IMC 99 discriminates whether or not CAQ 93 is empty by a signal EMP from the CAQ 93. If the CAQ 93 is empty, no real cell can be used so that at step 1208, the IMC 99 sets the REJ to "1". The reject signal REJ is transferred through the I-BUS 38 to the IMH 34. In response to the reject signal REJ "1", the IMH 34 again accesses the IMM 301.

If the CAQ 93 stores at least one real cell at step 1207, then at step 1209, the IMC 99 generates a read signal Q so that the real address is read from the CAQ 93.

Then, at step 1210, the IMC 99 generates a write signal CATWT so that the real address is stored in the logical address of the CAT 91. Simultaneously, the NOCELL bit in this logical address is changed to "1".

Then, at step 1211, the IMC 99 generates a write signal CMWT so that, by the specified logical address, data from the IMH 34 through the I-BUS and the data buses $D_0$ through $D_{15}$ is written into the real cell which is allocated to the specified logical address.

If the NOCELL bit is "1" at step 1205, this means that a real cell has been allocated to the specified logical address. Therefore, at step 1212, the real address allocated to the specified logical address is read from the CAT 91.

Then, at step 1213, if the R/W signal is the write signal, step 1211 is carried out. If the R/W signal is the read signal, then at step 1214, data is read from the real address of the CM 92. The read data is transferred through the data bus $D_0$ through $D_{15}$ and the I-BUS 38 to the PRC 35.

At step 1215, the IMC 99 disciminates whether or not a DUMP signal is transferred from the PRC 35. The DUMP signal is generated after each real cell is read. The DUMP signal signifies, during a lateral accessing, that the data is one real cell having 64 horizontal lines ($Y_0$-$Y_5$) is completely read. The DUMP signal also signifies, in a vertical accessing, that the data in one real cell having 64 vertical lines ($X_0$-$X_5$) is completely read. If the DUMP signal is not received, the process goes to END. If the DUMP signal is received, the IMC 99 generates a write signal CAWT so that the real address of the real cell read at step 1214 is written into the CAO 93. Then, at step 1217, the NOCELL bit in the specified logic address of the CAT 91 is turned to "0".

Figure 13:
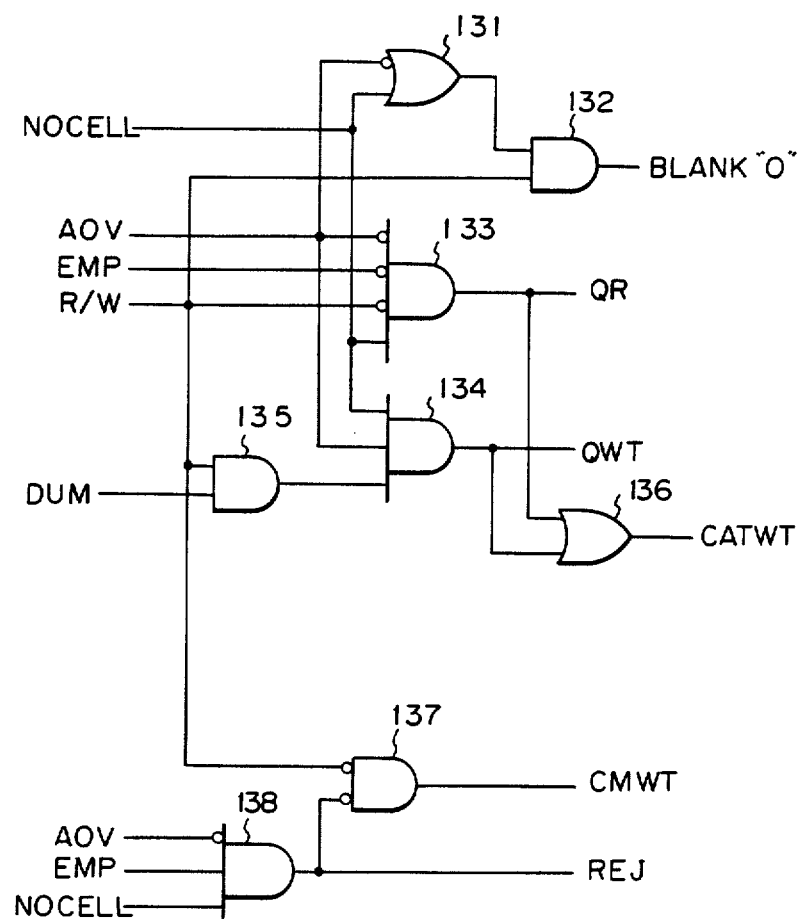
FIG. 13 is a logic circuit diagram of an image memory control unit in the image memory shown in FIG. 9.

FIG. 13 is a logic circuit diagram of the IMC 99 in the IMM 301 shown in FIG. 9. In FIG. 13, the IMC 99 includes OR gates 131 and 136, and AND gates 132 through 135 and 137 and 138. The IMC 99 receives the signals NOCELL. AOV, R/W, DUM, and EMP, and outputs the signals BLANK, QR, QWT, CATWT, CMWT, and REJ. The OR gate 131 and the AND gate 132 carry out the steps 1203 through 1208 in the flow chart shown in FIG. 12. The AND gates 133 through 136 carry out the steps 1209 through 1211 and the steps 1215 through 1217. The AND gates 137 and 138 carry out the steps 1202, 1203, 1206, and 1207.

Figure 14:
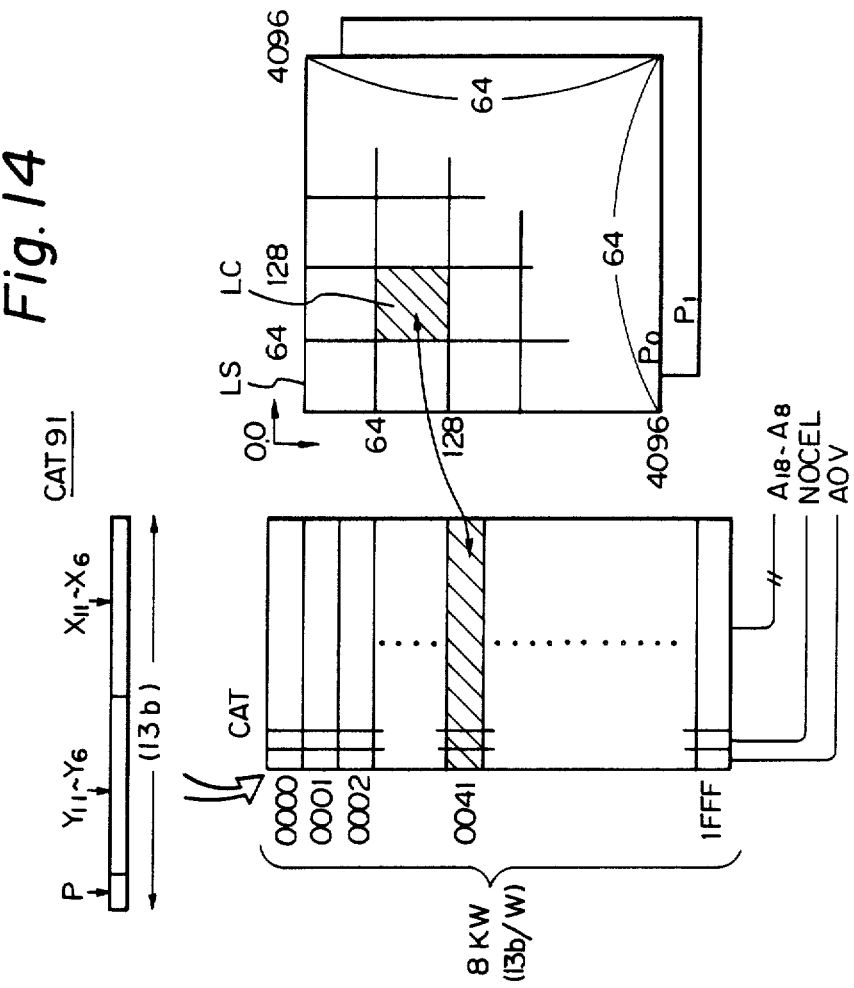
FIG. 14 is a cell address translate table (CAT) in the image memory shown in FIG. 9.

FIG. 14 shows the structure of the CAT 91 in the IMM 301 shown in FIG. 9. In FIG. 9, each logical address LOG.ADD of the CAT 91 consists of P, $Y_{11}$ through $Y_6$, and $X_{11}$ through $X_6$. The total number of bits in each logical address is thus 13. Each logical address LOG.ADD corresponds to one logical cell LC in the logical space LS. Each logical cell LC consists of 64 bits × 64 bits. One page of the logical space LS consists of 64 × 64 = 4096 logic cells LS. Therefore two pages of the logical space consists of 8 K logical cells. Accordingly, the number of the logical addresses of the CAT 91 is 8 K words, each word consisting of 13 bits.

Figure 15:
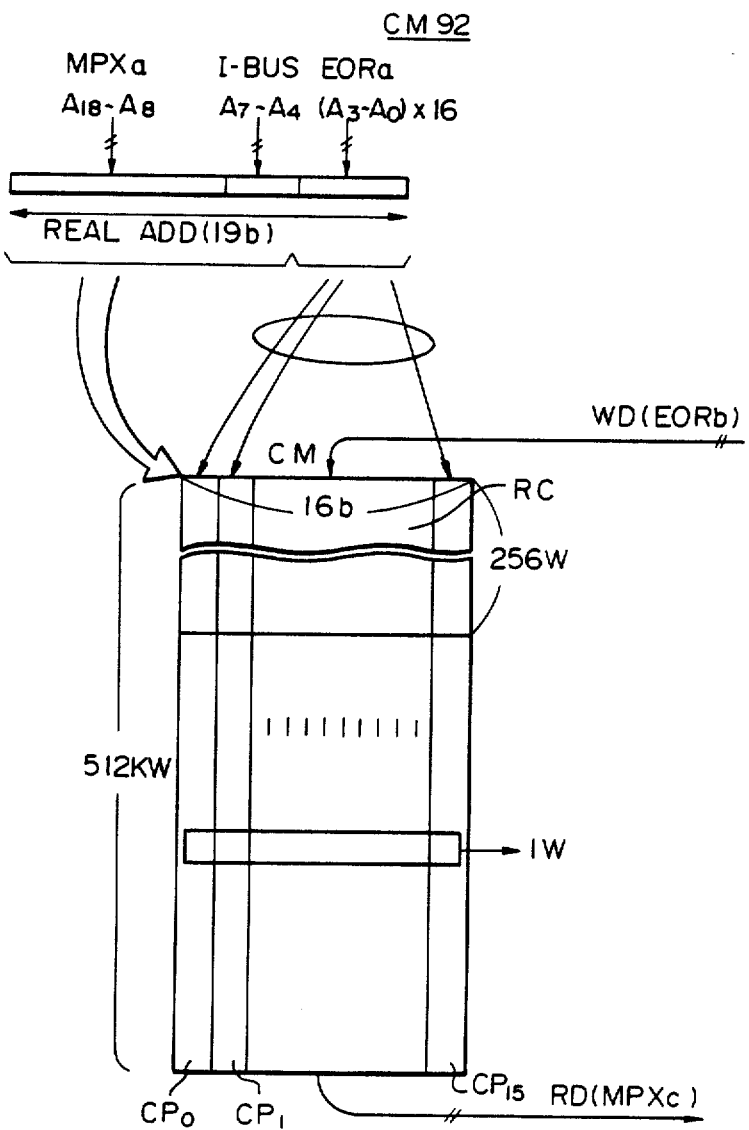
FIG. 15 is a cell memory (CM) in the image memory shown in FIG. 9.

FIG. 15 shows the structure of the CM 92 in the IMM 301 shown in FIG. 9. In FIG. 15, each real address of the CM 92 consists of 19 bits, i.e., $A_3$ through $A_0$ from the EORa 94, $A_7$ through $A_4$ from the I-BUS 38, and $A_{18}$ through $A_8$ from the CAT 91 through the MPXa 96. In the foregoing description with reference to FIG. 12, the low order bits of the logical addresses or real addresses are not taken into account. However, in practice, the low order bits are used in order to develop the image data into a bit pattern on the CM 91, and, in particular, in order to realize lateral accessing or vertical accessing, as later described in more detail.

The CM 92 consists of 16 memory chips $CP_0$ through $CP_{15}$. Each memory chip consists of 512 K bits. Therefore, the CM 92 consists of 512 K × 16 = 8000 K bits, i.e., 512 K words, where one word consists of 16 bits. Since a real cell RC consists of 256 words, the CM 92 consists, in this example, of 2 K real cells. Remember that the logical space for one page consists of 4 K cells as described with reference to FIG. 14. The reason why the number of real cells is smaller than the number of logical cells is because the size of the printing page does not always require the same address space as the logical space. For example, when the printing paper has different longitudinal and horizontal side lengths, the real address space does not require the full square of the longer side.

The high order address signals $A_{18}$ through $A_8$ are obtained by address conversion from the address signals $X_6$ through $X_{11}$, $Y_6$ through $Y_{11}$, and P by the CAT 91 and the CAQ 93, as described before with reference to FIGS. 10 through 12. The middle order address signals $A_7$ through $A_4$ are directly obtained from the address signals $X_4$, $X_5$, $Y_4$, and $Y_5$. These addresses are commonly specified for all of the memory chips $CP_0$ through $CP_{15}$.

The low order addresses $A_3$ through $A_0$, however, are different for respective memory chips $CP_0$ through $CP_{15}$. The addresses $A_3$ through $A_0$ are obtained by converting the addresses $X_3$ through $X_0$, and $Y_3$ through $Y_0$ by the EORa 94, as later described in detail. This conversion is necessary in order to carry out lateral accessing, vertical accessing, or plane accessing.

To clarify this, and referring back to FIG. 8B, if the vertical accessing should be carried out, one accessing is to be effected on an area of 1 bit in the X direction × 16 bits in the Y direction in the CM 92. However, as will be seen from the structure of the CM 92 shown in FIG. 15, the 16 bits in the Y direction are all included in the same memory chip, and it is impossible to simultaneously access plural addresses on the same memory chip.

By address conversion, one word of accessing becomes possible in any lateral, vertical, or plane accessing.

The lateral, vertical, and plane accessing operations per se are prior art are disclosed in Japanese Patent Application No. 58-117405. Here, a brief explanation of the lateral accessing and vertical accessing is given with reference to FIGS. 16 and 17.

Figure 16:
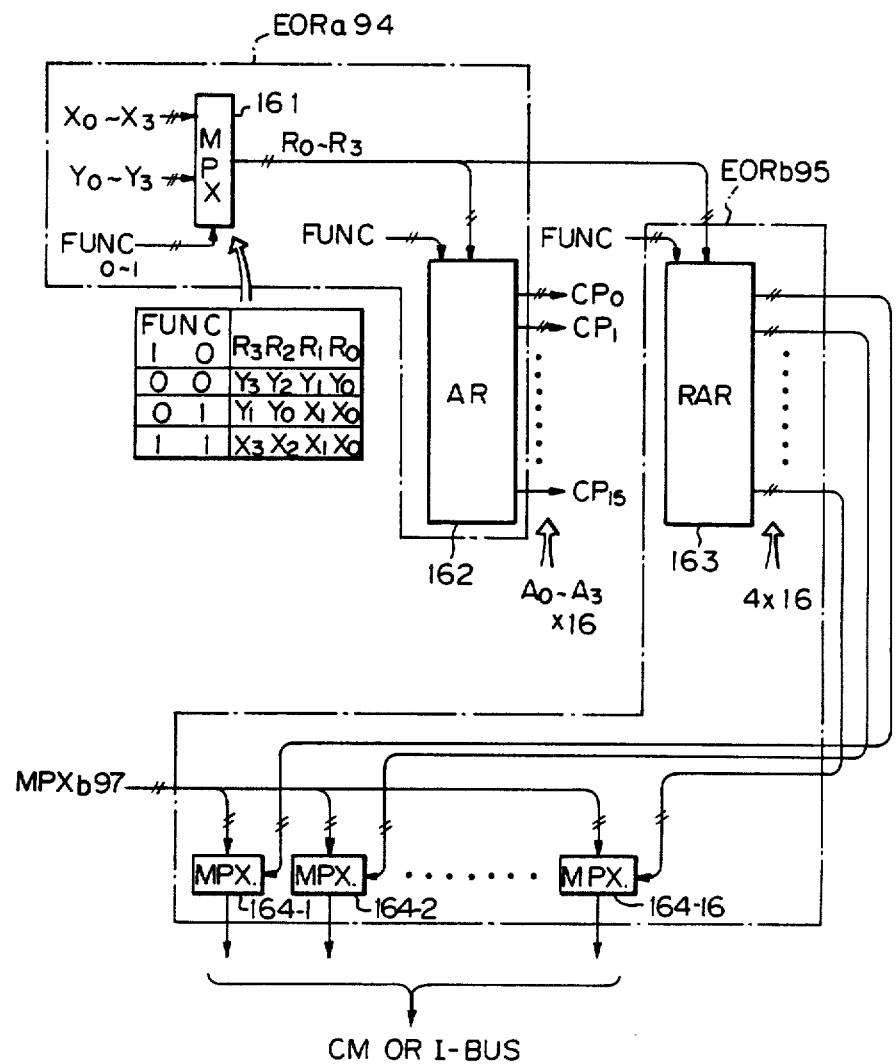
FIG. 16 is a block diagram of $EOR_a$ and $EOR_b$ in the image memory shown in FIG. 9, for explaining vertical accessing and horizontal accessing.

FIG. 16 is a block diagram showing in detail the EOR 94 and the EORe 95 in the IMM 301 shown in FIG. 9. In FIG. 16, the EORa 94 includes a multiplexer 161 and an address arranging circuit (AR) 162. The EORb 95 includes an address rearranging circuit (RAR) 163, and sixteen multiplexers 164-1 through 164-16.

The multiplexer 161 receives the address signals $X_0$ through $X_3$, $Y_0$ through $Y_3$, and a function signal FUNC indicating whether the access to the CM is a vertical access (1 bit × 16 bits), horizontal access (16 bits × 1 bit), or plane access (4 bits × 4 bits). In response to the function signal FUNC, the multiplexer selects output signal $R_0$ through $R_3$. The relationship between the function signal FUNC and the output signals $R_0$ through $R_3$ is shown in a table in FIG. 16. That is, when the function signal FUNC is 00, indicating that vertical accessing should be carried out, then the multiplexer 161 selects the address signals $X_0$ through $X_3$ as the output signals $R_0$ through $R_3$. When the function signal FUNC is 01, indicating that plane accessing should be carried out, the multiplexer 161 selects the address signals $X_0$, $X_1$, $Y_0$, and $Y_1$ as the output signals $R_0$ through $R_3$. When the functional signal FUNC is 11, indicating that horizontal accessing should be carried out, the multiplexer 161 selects the address signals $Y_0$ through $Y_3$ as the output signals $R_0$ through $R_3$. The output signals $R_0$ through $R_3$ are supplied to the AR 162 and to the RAR 163. The AR 162 generates, in accordance with a predetermined rule and in response to the functional signal FUNC, sixteen addresses as the low order addresses ($A_0$ through $A_3$)×16 for accessing respective memory chips $CP_0$ through $CP_{15}$. The sixteen addresses ($A_0$ through $A_3$)×16 differ from each other, as mentioned above with reference to FIG. 15. Thus, the low order addresses ($A_0$ through $A_3$)×16 are determined for vertical, lateral, or plane accessing.

To write data in or to read data from the CM 92, the RAR generates, in accordance with another predetermined rule and in response to the functional signal FUNC, sixteen data selecting signals. Each of the data selecting signals consists of four bits. These data selecting signals are applied to the multiplexers 164-1 through 164-16, respectively. Thus, the multiplexers 164-1 through 164-1 respectively select corresponding data transferred from the MPXb 97 (FIG. 9), as data to be output. The data output from the multiplexers 164-1 through 164-16 is then transferred to the CM 92 to be written therein or to the I-BUS 38 as read data.

By the above-described arrangement and rearrangement of the address signals $R_0$ through $R_3$, the 16 bit addresses for one accessing operation always construct one word from sixteen memory chips $CP_0$ through $CP_{15}$.

Figure 17A:
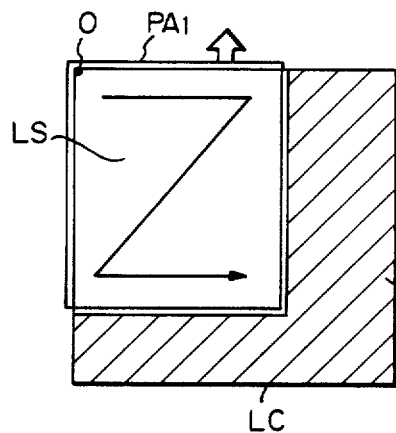
FIGS. 17A and 17B are diagrams for explaining an inhibit area for both vertical printing and horizontal printing.
Figure 17B:
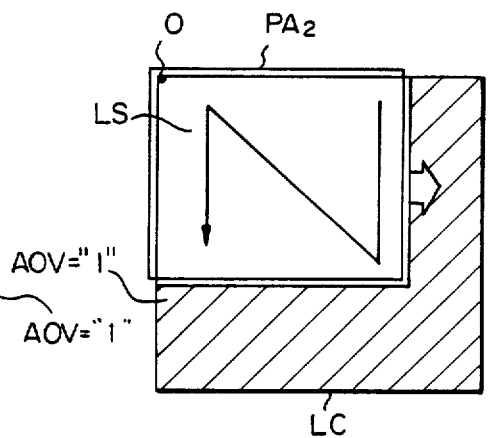

FIG. 17A is a diagram explaining a feeding direction of a printing paper $PA_1$, for printing a so-called portrait style. FIG. 17B is a diagram for explaining another feeding direction of a printing paper $PA_2$, for printing a co-called landscape style.

The printing papers $PA_1$ and $PA_2$ often have different longitudinal and horizontal side lengths. The feeding direction in both cases is usually perpendicular to the shorter side of the printing paper because of the drum size of the printer assembly.

Figure 18A:
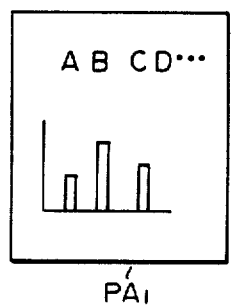
FIGS. 18A and 18B are diagrams of the direction in which characters and pictures are printed with respect to the printing paper.
Figure 18B:
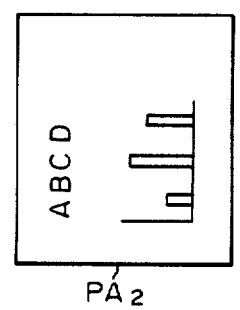

For the portrait style, the characters and pictures are printed in the direction parallel to the shorter side of the printing paper $PA_1$, as shown in FIG. 18A. For the landscape style, the characters and pictures are printed in the direction parallel to the longer side of the printing paper $PA_2$, as shown in FIG. 18B.

When writing data in the portrait style, horizontal accessing is preferable, and when writing data in the landscape style, vertical accessing is preferable.

In FIGS. 17A and 17B, the logical space LC is shown as a square. The point O on the upper left side of the logic space LS is the origin of the logical space LS. Since the side length of the printing page $PA_1$ or $PA_2$ is shorter than the side of the square logical space, the slashed area is not necessary. Therefore, the logical addresses in the slashed area are provided with the AOV="1", as described before. By this simple method, no real address is allocated to these logical addresses provided with the AOV="1". As a result, the real memory may have a smaller address space than the logical space as mentioned before with reference to FIG. 15.

In both the portrait and the landscape styles, the RPC 35 (FIG. 4) reads the CM 92 (FIG. 9) in the direction perpendicular to the paper feeding direction.

Figure 19:
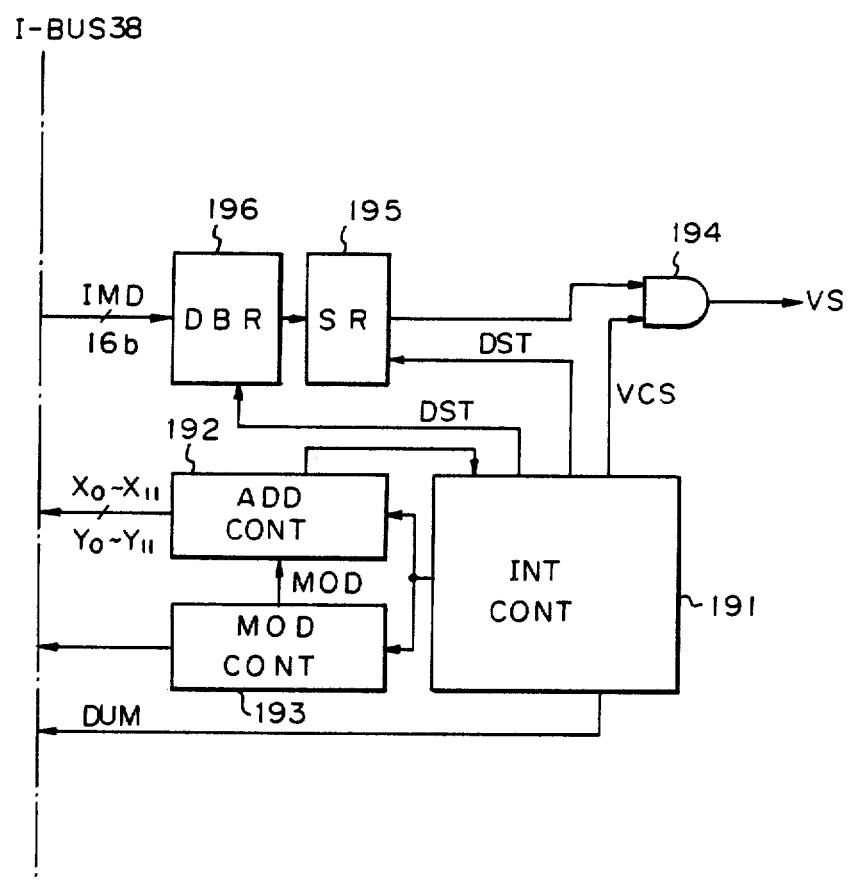
FIG. 19 is a block diagram of PRC 35 in FIG. 4.

FIG. 19 is a block diagram showing the general construction of the PRC 35 in FIG. 4. In FIG. 19, the PRC 35 includes an IMM interface control circuit (INT CONT) 191, an address control circuit 192, a mode control circuit (MOD CONT) 193, a video control AND gate 194, a shift register (SR) 195, and a data buffer register (DBR) 196.

The PRC 35 sends various control signals from the INT CONT 191, the ADD CONT 192, and the MOD CONT 193 through the I-BUS 38 to the IMM 30 (FIG. 4). The DBR 196 receives image data (IMD) from the IMM 30 through the I-BUS 38. The data stored in the DBR 196 is transferred to the SR 195. The SR 195 then converts the image data into serial data in accordance with a control signal from the INT CONT 191. The serial data from the SR 195 is gated by the AND gate 194. Thus, the video signal VS is obtained as a logical product of the serial data and a video control signal (VCS) from the INT CONT 191.

The INT CONT 191 sends the dump signal DUM when the PRC has read one read cell, so as to open the real cell, i.e., to allow it to be used for writing new data therein.

The MOD CONT 193 controls the reading direction, i.e., the portrait or the landscape by generating a mode signal MOD. The ADD CONT 192 controls the reading address.

Figure 20:
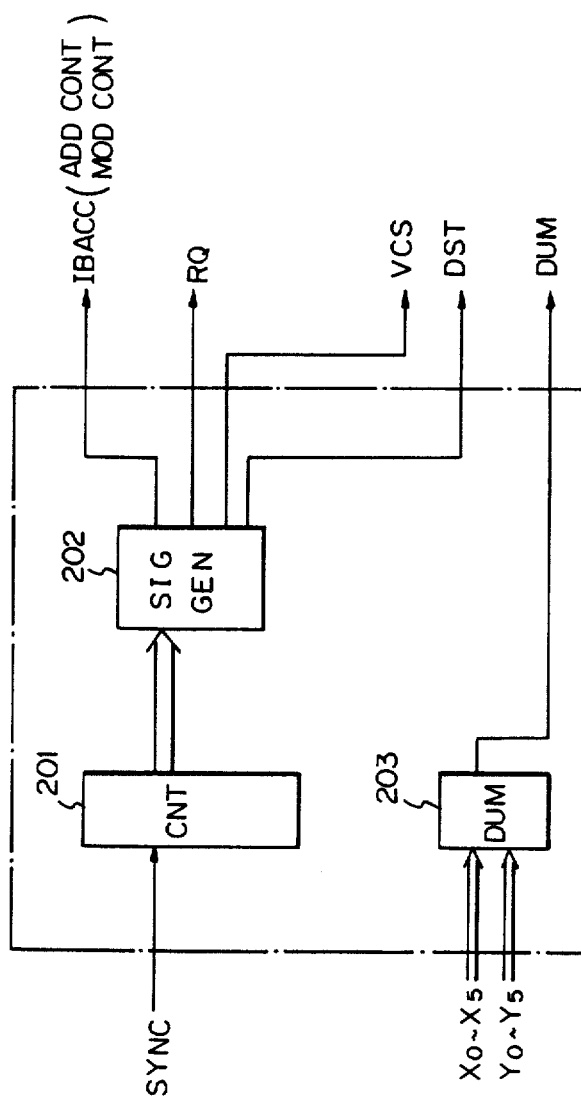
FIG. 20 is a block diagram of INT CONT 191.

FIG. 20 is a block diagram of the INT CONT 191. In FIG. 20, a line address counter (CNT) 201 counts one scanning line (64 counts). Based on the counting value, a signal generator (SIG GEN) 202 generates a timing data IBACC for transferring address signals and mode data, the timing data being supplied to the ADD CONT 192 and MOD CONT 193 (FIG. 19), the data request signal RQ, the video control signal VCS, and the data set timing signal DST being applied to the DBR 196 and the SR 195 (FIG. 19).

Also, a dump instructing circuit (DUM) 203 generates the dump signal DUM based on the addresses $X_0$ through $X_5$ and $Y_0$ through $Y_5$ for accessing the IMM 30.

FIG. 21A is a block circuit diagram of the address control circuit (ADD CONT) 192 shown in FIG. 19. In FIG. 21A, reading addresses $X_0$ through $X_{11}$ and $Y_0$ through $Y_{11}$ are obtained as follows.

When the mode signal MOD specifies the portrait style as shown in FIG. 17A, a count value "0" is initially loaded from a multiplexer 211 into an up/down counter 212 for generating the X addresses $X_0$ through $X_{11}$. Then an up/down control signal U/D CONT controls the U/D CNT 212 so as to count up by sixteen in response to one clock signal CLK X which represents a data set timing (CLK 1). A counter (CNT) 213 counts up from zero by one in response to a one line (64 counts) scanning (CLK Y=CLK 2).

When the mode signal MOD specifies the landscape style as shown in FIG. 17B, a value representing the width in the X direction of the printing paper is loaded from a register (REG) 214 into the U/D CNT 212 for generating the X addresses. The value is transferred from the C-BUS 36 and is stored in the register 214. Then the U/D CNT 212 counts down by one in response to one line (64 counts) scanning (CLK X=CLK 2). The CNT 213 for the Y addresses counts up by sixteen in response to the data set timing (CLK Y=CLK 1).

FIG. 21B is a logic circuit for generating the clock signals CLK X and CLK Y. As will be seen from FIG.

21B, when the portrait style printout takes place, MOD is "1" and *MOD is "0" so that the CLK X is equal to the CLK 1 and the CLK Y is equal to the CLK 2. When the landscape style printout takes place, MOD is "1" and MOD is "0" so that the CLK X is equal to the CLK 2, and the CLK Y is equal to the CLK 1.

The present invention is not restricted to the foregoing description of the preferred, embodiment, and various changes and modifications are possible within the scope of the invention.

For example, although the explanation of the IMM 30 is mainly described with respect to the character generator controller (CGC) 340, the principal idea of the allocation of the real cells to logical addresses according to the present invention can be similarly applied when the vector generator controller (VGC) 341, the overlay pattern controller (OVC) 342, or the image generator controller (IMC) 343 is activated.

Further, the unit of the rear cell or logical cell is not restricted to the described example of 64 bits×64 bits, but may be of any scale including 1 bit×1 bit.

Still further, in the foregoing description the CAQ 93 is described as a "first-in first-out" (FIFO) circuit. However, in place of the CAQ 93, any memory can be used for storing the real addresses which are not being used as long as its input sequence and output sequence are controlled under a certain acknowledgeable condition.

From the foregoing description, it will be apparent that, according to the present invention, an improved memory access control apparatus can be obtained in which the real memory storing capacity is decreased without deteriorating the reading speed. The memory access control apparatus according to the present invention can effect a continuous reading of different pages on the logical space without employing different real memory planes but using a single real memory plane. Further, according to the present invention, the writing of image data in one page of a logical space is not limited to a top to bottom operation but the image data can be written in any position on the page as long as at least one real cell is not being used for reading or writing.

Accordingly, the present invention is particularly advantageous in the field of a high speed transmission of image data from an image memory to, for example, a laser printer.

I claim:

1. A memory access control apparatus comprising:
    a memory having a memory capacity for storing data of a plurality of first transfer units forming a second transfer unit, the data being divided into said first transfer units and respectively stored in different storing locations, the storing locations being allocated with read addresses;
    an empty real address storing means for storing empty real addresses of the storing locations into which data can be written;
    address pair storing means for storing real addresses corresponding to logical addresses of the first transfer units of data stored in said memory, said real addresses being those of the storing locations in said memory where said first transfer units of data are stored;
    data write-in means, connected to said empty real address storing means, for writing data into a storing location in said memory corresponding to an empty real address read from said empty real address storing means each time a first transfer unit of data is transferred;
    data read-out means, connected to said address pair storing means, for reading data from the storing location in said memory corresponding to the real address of a given logical address, the real address being read from said address pair storing means each time a logical address of one of said first transfer units is received; and
    control means, connected to said address pair storing means and said data read-out means, for allocating logical addresses constructing a sequence according to a sequence of said first transfer units to be read out for reach said second transfer unit, for effecting a write operation in which data in said first transfer units within each said second transfer unit are randomly transferred to said data write-in means to effect the write process in said data write-in means, and at the same time for storing, in said address pair storing means, a correspondence between the logical address allocated to said first transfer units and the real address of the storing location in said memory into which said data has been written, for effecting a read operation in which logical addresses corresponding to respective first transfer units in said allocated sequence are output to said data read-out means, and for storing the real address of the storing location in said memory, from which the data of said first transfer units has been read by said data read-out means, into said empty real address storing means, when a continuous writing operation is effected on an n page, a continuous reading operation is simultaneously effected from an n-1 page, where n is a positive integer greater than or equal to 2.

2. A memory access control apparatus as set forth in claim 1, wherein said memory has a real address space equal to one page of printing paper, wherein said address pair storing means has a logical space equal to at least two pages of printing paper, and wherein during a reading of one page, a simultaneous writing into another page is performed.

3. A memory access control apparatus as set forth in claim 1, wherein said address pair storing means comprises, at each logical address, a correspondence establishing bit indicating whether or not a correspondence is established between said real address and said logical address, said correspondence establishing bit being output by said control means after said transfer unit of data is written into said memory, and said correspondence establishing bit not being output by said control means after said transfer unit of data is read, and wherein a new real address being made to correspond to said logical address at which time said correspondence establishing bit is not output.

4. A memory access control apparatus as set forth in claim 3, wherein said empty real address storing means is a first-in first-out circuit for storing said real address, said read real address stored in said first-in first-out circuit can be made to correspond to a specified logical address at which time said correspondence establishing bit is not output.

5. A memory access control apparatus as set forth in claim 4, wherein said address pair storing means comprises, at each logical address, a correspondence inhibiting bit indicating whether or not said logical address corresponds to said real address.

6. A memory access control apparatus as set forth in claim 5, wherein said control means comprises a blank signal generating means for generating white area data so as to print out a space when said correspondence inhibiting bit is in an ON state during a reading operation, and when said correspondence establishing bit is in an OFF state during a reading operation.

7. A memory access control apparatus as set forth in claim 1, wherein said data write-in means and said data read-out means comprise an address conversion means for converting one of the data written into or read out of the storing location in said memory into one of a lateral accessing address and a vertical accessing address, respectively.

8. A memory access control apparatus comprising:
a memory having a memory capacity for storing data in a plurality of first transfer units forming a second transfer unit, each of said first transfer units being a memory cell, said data being divided into said first transfer units and respectively stored at different storing locations, the storing locations being respectively allocated with real addresses;
an empty real address storing means for storing empty real addresses of the storing locations into which data can be rewritten;
address pair storing means for storing real addresses corresponding to logical addresses of said first transfer units of data stored in said memory, said real addresses being those of the storing locations in said memory where said first transfer units of data are stored, said address storing pair means including two sets of address translate tables being alternately used, a first one of said two sets of address translate tables being used for a writing operation and a second one of said two sets of address tables being used for a reading operation;
data write-in means connected to said empty real address storing means, for writing data into a storing location in said memory corresponding to an empty real address read from said empty real address storing means each time one of said first transfer units of data is transferred;
data read-out means connected to said address pair storing means, for reading data from the storing location in said memory corresponding to the real address of a given logical address, the real address being read from said address pair storing means each time a logical address of one of said first transfer units is received; and
control means connected to said address pair storing means and said data read-out means, for allocating logical addresses constructing a sequence according to a sequence of said first transfer units to be read out for each said second transfer unit, for effecting a writing operation in which data of said first transfer units within each said second transfer unit are randomly transferred to said data a write-in means to effect the writing operation in said data write-in means and at the same time, for storing in said address pair storing means, a correspondence between the logical address allocated to said first transferring units and the real address of the storing location in said memory into which data has been written, for effecting a read operation in which logical addresses corresponding to said respective first transfer units into said allocated sequence are read out to said data read-out means, and for storing the real address of the storing location in said memory from which data from said first transfer units has been read by said data read-out means into said empty real address storing means, said control means effecting a writing operation of said transferred data into one of said address translate tables of said address pair storing means, the other one of said address translate tables being used for a reading operation in which the resulting empty real address is stored in said empty real address storing means so that the empty real address is used as a real address for storing transfer data into one of said address translate tables, each said second transfer unit corresponding to one of said two sets of address translate tables, when a continuous writing operation is effected on an n page, a continuous reading operation is simultaneously effected from an n-1 page, where n is a positive integer greater than or equal to 2.

9. A memory access control apparatus as set forth in claim 8, wherein said memory has a real address space equal to one page of printing paper, wherein said address pair storing means has a logical space equal to at least two pages of printing paper, and wherein during a reading of one page, a simultaneously writing into another page is performed.

10. A memory access control apparatus as set forth in claim 8, wherein said address pair storing means comprises, at each logical address, a correspondence establishing bit indicating whether or not a correspondence is established between said real address and said logical address, said correspondence establishing bit being output by said control means after said transfer unit of data is written into said memory, and said correspondence establishing bit not being output by said control means after said transfer unit of data is read, and wherein a new real address being made to correspond to said logical address at which time said correspondence establishing bit is not output.

11. A memory access control apparatus as set forth in claim 10, wherein said empty real address storing means is a first-in first-out circuit for storing said real address, said read real address stored in said first-in first-out circuit can be made to correspond to a specified logical address at which time said correspondence establishing bit is not output.

12. A memory access control apparatus as set forth in claim 11, wherein said address pair storing means comprises, at each logical address, a correspondence inhibiting bit indicating whether or not said logical address corresponds to said real address.

13. A memory access control apparatus as set forth in claim 12, wherein said control means comprises a blank signal generating means for generating white area data so as to print out a space when said correspondence inhibiting bit is in an on state during a reading operation, and when said correspondence establishing bit is in an off state during a reading operation.

14. A memory access control apparatus as set forth in claim 8, wherein said data read-in means and said data read-out means comprise an address conversion means for converting one of the data written into or read out of the storing location in said memory into one of a lateral accessing address and a vertical accessing address, respectively.

* * * * *

UNITED STATES PATENT AND TRADEMARK OFFICE
CERTIFICATE OF CORRECTION

PATENT NO. : 4,890,226
DATED : DECEMBER 26, 1989
INVENTOR(S) : SUMIO ITOH

Page 1 of 2

It is certified that error appears in the above-identified patent and that said Letters Patent is hereby corrected as shown below:

FRONT PAGE [54] Title, line 3, "REAT" should be --REAL--.

Col. 1, line 3, "REAT" should be --REAL--.

Col. 2, line 54, "a in" should be --a problem in--;
line 55, "device problem;" should be --device;--.

Col. 5, line 8, "CTG" should be --CTP 31--;
line 67, "thee" should be --the--.

Col. 7, line 12, "6" should be --5--.

Col. 10, line 31, "WC 656" should be --WCC 656--;
line 32, "WC 656," should be --WCC 656,--;
line 41, "WC 656" should be --WCC 656--;
line 42, "WC 656" should be --WCC 656--;
line 48, "cata" should be --data--;
line 58, "WC 656" should be --WCC 656--.

Col. 11, line 9, "SRb 651f" should be --SRb 651--;
line 42, "I-VUS 38." should be --I-BUS 38.--.

Col. 12, line 57, "CM 82" should be --CM 92--.

Col. 13, line 30, "operation" should be --operations--;
line 68, "22," should be --21,--.

Col. 14, line 65, "Q" should be --QR--.

UNITED STATES PATENT AND TRADEMARK OFFICE
CERTIFICATE OF CORRECTION

PATENT NO. : 4,890,226

DATED : DECEMBER 26, 1989

INVENTOR(S) : SUMIO ITOH

It is certified that error appears in the above-identified patent and that said Letters Patent is hereby corrected as shown below:

Col. 15, line 30, "CA0" should be --CAQ--;
        line 66, "CM 91," should be --CM 92--.

Col. 16, line 45, "art are" should be --art and a--;
        line 49, "EOR" should be --EORa--.

Col. 17, line 24, "164-1" should be --164-16--;
        line 38, "co-called" should be --so-called--.

Col. 18, line 41, "30." should be --301.--.

Col. 19, line 4, "MOD" should be --*MOD--;
        line 11, "IMM 30" should be --IMM 301--.

Signed and Sealed this

Eleventh Day of December, 1990

Attest:

HARRY F. MANBECK, JR.

*Attesting Officer*      *Commissioner of Patents and Trademarks*